(12) United States Patent
Oldfield et al.

(10) Patent No.: US 8,458,527 B2
(45) Date of Patent: Jun. 4, 2013

(54) METHOD AND APPARATUS FOR SAS SPEED ADJUSTMENT

(75) Inventors: Clive Scott Oldfield, Longmont, CO (US); Tony Richard Kilwein, Louisville, CO (US); Mark Aaron VonLintel, Loveland, CO (US)

(73) Assignee: Dot Hill Systems Corporation, Longmont, CO (US)

( * ) Notice: Subject to any disclaimer, the term of this patent is extended or adjusted under 35 U.S.C. 154(b) by 427 days.

(21) Appl. No.: 12/881,353

(22) Filed: Sep. 14, 2010

(65) Prior Publication Data

US 2011/0191644 A1 Aug. 4, 2011

Related U.S. Application Data

(63) Continuation-in-part of application No. 12/840,480, filed on Jul. 21, 2010.

(60) Provisional application No. 61/301,440, filed on Feb. 4, 2010.

(51) Int. Cl.
*G06F 11/00* (2006.01)

(52) U.S. Cl.
USPC .................... 714/43; 714/55; 714/56

(58) Field of Classification Search
USPC .............................. 714/43, 55, 56
See application file for complete search history.

(56) References Cited

U.S. PATENT DOCUMENTS

| | | | |
|---|---|---|---|
| 5,491,687 A * | 2/1996 | Christensen et al. | 370/253 |
| 6,625,761 B1 | 9/2003 | Sartore et al. | |
| 6,671,831 B1 | 12/2003 | Sartore et al. | |
| 6,690,650 B1 | 2/2004 | Stener | |
| 6,738,834 B1 | 5/2004 | Williams et al. | |
| 6,973,602 B1 * | 12/2005 | Fung et al. | 714/704 |
| 7,543,190 B2 | 6/2009 | Walker | |
| 7,836,352 B2 | 11/2010 | Sharma et al. | |
| 8,032,809 B2 | 10/2011 | Park et al. | |
| 8,051,334 B2 | 11/2011 | Jones et al. | |
| 8,184,677 B1 | 5/2012 | McRobert et al. | |
| 2008/0005620 A1 | 1/2008 | Walker | |
| 2011/0103439 A1 | 5/2011 | McKay et al. | |
| 2011/0106997 A1 | 5/2011 | Romero et al. | |

OTHER PUBLICATIONS

Information technology—Serial attached SCSI-2.1 (SAS-2.1), working draft, American National Standard, Project T10/2125-D, Revision 02, May 19, 2009.
Information technology—SAS Protocol Layer (SPL), working draft, American National Standard, Project T10/2124-D, Revision 02, May 19, 2009.
Official action for U.S. Appl. No. 12/840,480, mailed Sep. 19, 2012.

(Continued)

*Primary Examiner* — Joshua P Lottich
(74) *Attorney, Agent, or Firm* — Thomas J. Lavan

(57) ABSTRACT

A method for maintaining reliable communication on a bidirectional communication link is provided. A receiver on the bidirectional communication link detects an error and maintains a count of detected errors. The transmitter on the bidirectional communication link polls the receiver in order to determine the count of detected errors, and performs a downshift evaluation for the bidirectional communication link. In response to performing the downshift evaluation for the bidirectional communication link, the transmitter maintains a transmission speed of the bidirectional communication link if the downshift evaluation determines that forgoing transmission speed downshift is required for the bidirectional communication link, and reduces the transmission speed of the path if the downshift evaluation determines that transmission speed downshift is required for the bidirectional communication link.

18 Claims, 13 Drawing Sheets

OTHER PUBLICATIONS

Information technology—Serial attached SCSI—2.1 (SAS-2.1), Working draft, American National Standard, Project T10/2125-D, Revision 02, May 19, 2009.

Related U.S. Appl. No. 12/840,480 "Method and apparatus for SAS speed adjustment". U.S. Appl. No. 12/881,353 is a Continuation-in-Part of U.S. Appl. No. 12/840,480.

Notice of Allowance for U.S. Appl. No. 12/840,480, mailed Jan. 10, 2013.

Notice of Allowance for U.S. Appl. No. 12/840,480, mailed Feb. 22, 2013.

* cited by examiner

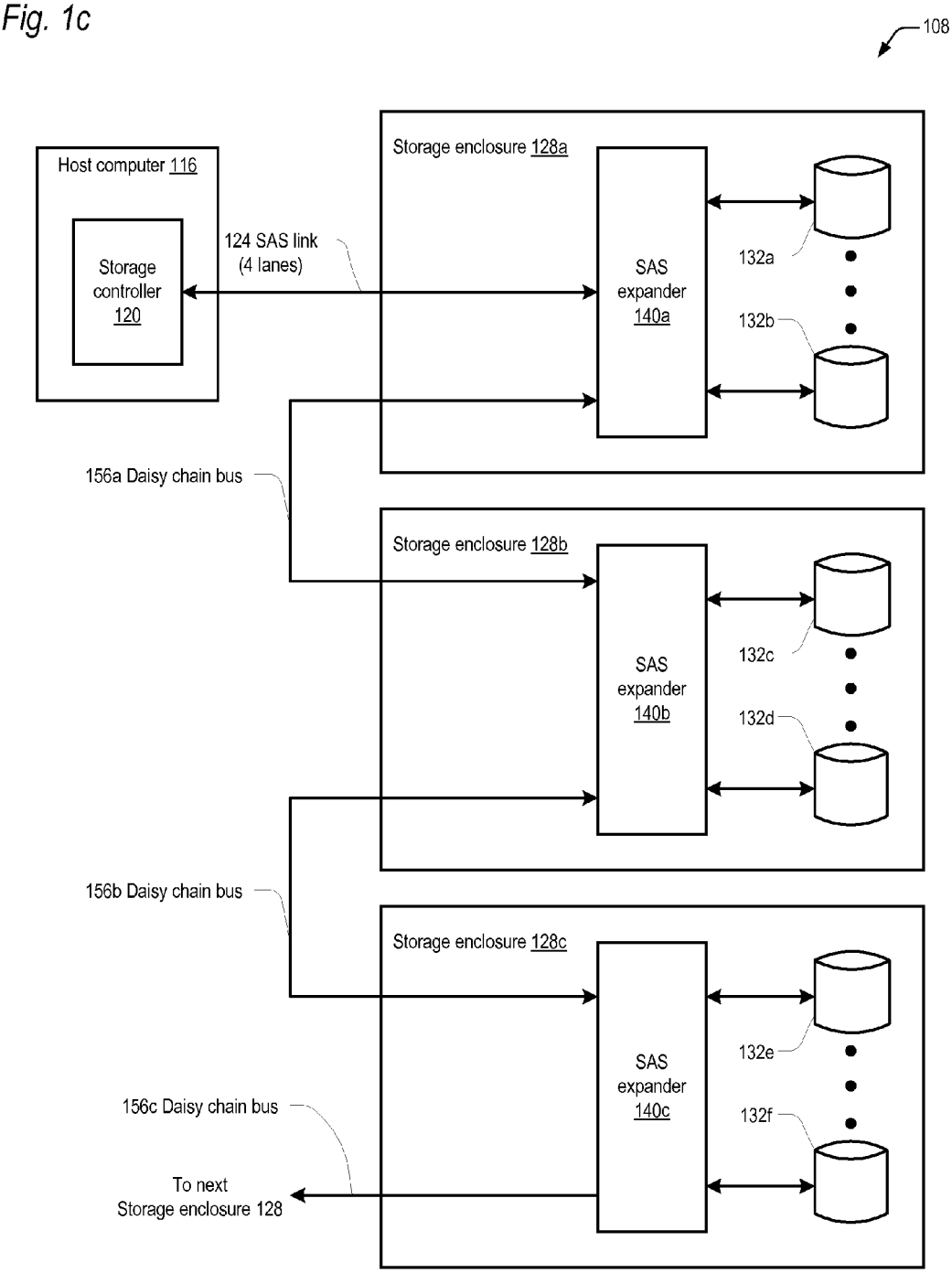

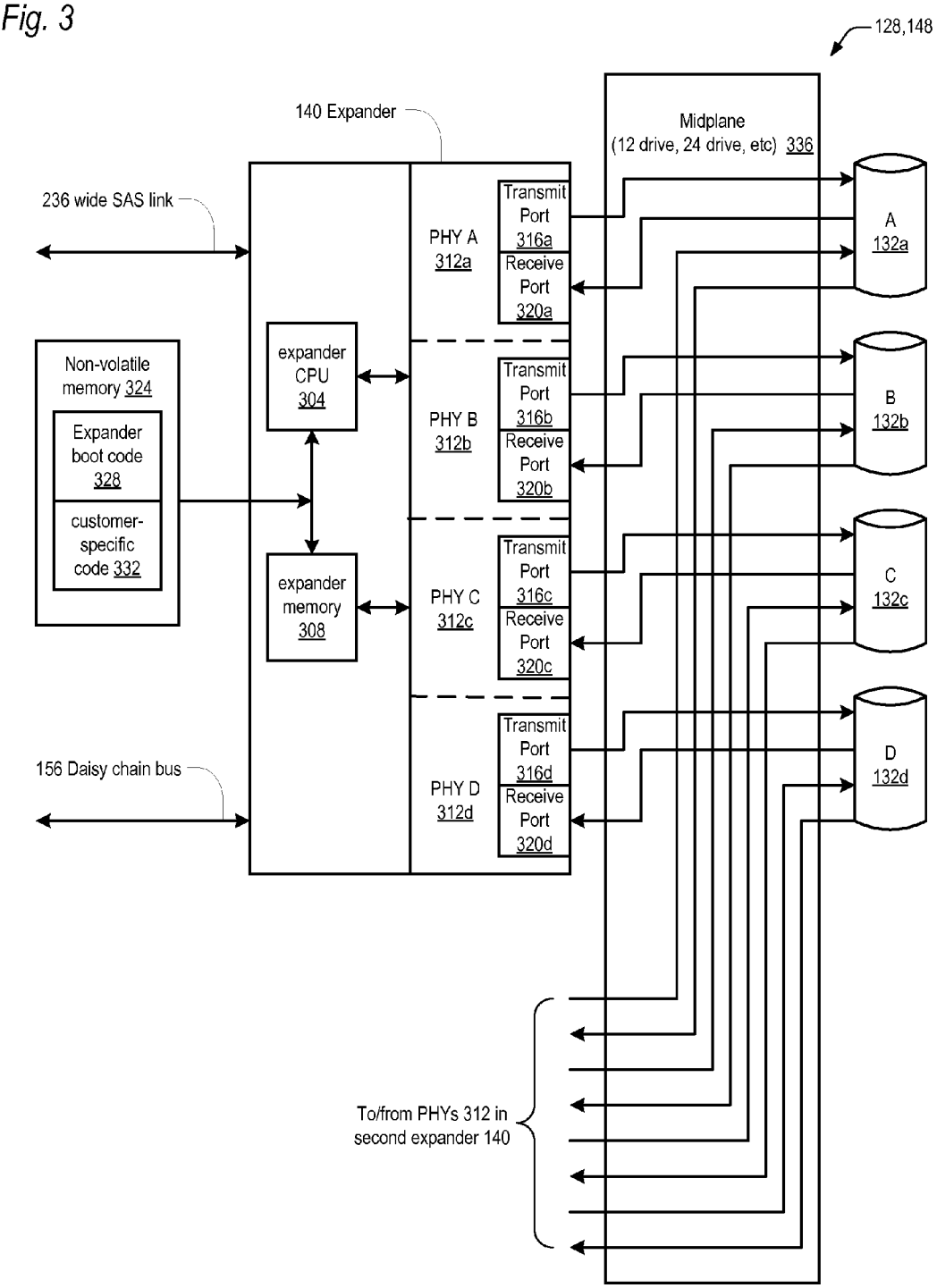

Fig. 7

| target device type 708 | storage enclosure slot 704 | | | | | | |
|---|---|---|---|---|---|---|---|
| | slot 0 | slot 1 | slot 2 | slot 3 | slot 4 | slot 5 | slot 6 |
| target device 0 | PHY parameters 0,0 | PHY parameters 0,1 | PHY parameters 0,2 | PHY parameters 0,3 | PHY parameters 0,4 | PHY parameters 0,5 | PHY parameters 0,6 |
| target device 1 | PHY parameters 1,0 | PHY parameters 1,1 | PHY parameters 1,2 | PHY parameters 1,3 | PHY parameters 1,4 | PHY parameters 1,5 | PHY parameters 1,6 |
| target device 2 | PHY parameters 2,0 | PHY parameters 2,1 | PHY parameters 2,2 | PHY parameters 2,3 | PHY parameters 2,4 | PHY parameters 2,5 | PHY parameters 2,6 |
| target device 3 | PHY parameters 3,0 | PHY parameters 3,1 | PHY parameters 3,2 | PHY parameters 3,3 | PHY parameters 3,4 | PHY parameters 3,5 | PHY parameters 3,6 |
| target device 4 | PHY parameters 4,0 | PHY parameters 4,1 | PHY parameters 4,2 | PHY parameters 4,3 | PHY parameters 4,4 | PHY parameters 4,5 | PHY parameters 4,6 |
| target device 5 | PHY parameters 5,0 | PHY parameters 5,1 | PHY parameters 5,2 | PHY parameters 5,3 | PHY parameters 5,4 | PHY parameters 5,5 | PHY parameters 5,6 |
| target device 6 | PHY parameters 6,0 | PHY parameters 6,1 | PHY parameters 6,2 | PHY parameters 6,3 | PHY parameters 6,4 | PHY parameters 6,5 | PHY parameters 6,6 |
| target device 7 | PHY parameters 7,0 | PHY parameters 7,1 | PHY parameters 7,2 | PHY parameters 7,3 | PHY parameters 7,4 | PHY parameters 7,5 | PHY parameters 7,6 |
| target device 8 | PHY parameters 8,0 | PHY parameters 8,1 | PHY parameters 8,2 | PHY parameters 8,3 | PHY parameters 8,4 | PHY parameters 8,5 | PHY parameters 8,6 |
| target device 9 | PHY parameters 9,0 | PHY parameters 9,1 | PHY parameters 9,2 | PHY parameters 9,3 | PHY parameters 9,4 | PHY parameters 9,5 | PHY parameters 9,6 |
| | slot 0 average PHY parameters | slot 1 average PHY parameters | slot 2 average PHY parameters | slot 3 average PHY parameters | slot 4 average PHY parameters | slot 5 average PHY parameters | slot 6 average PHY parameters |
| | average PHY parameters 712 | | | | | | |

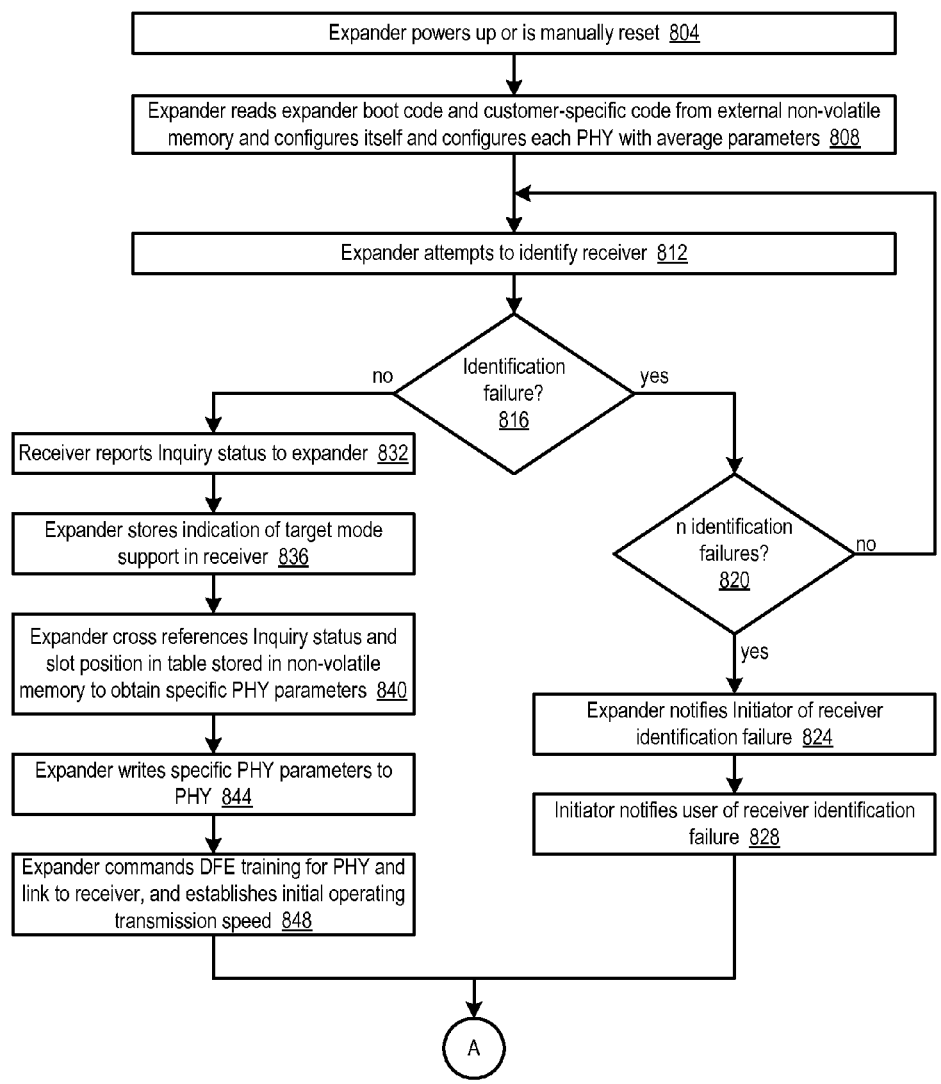
Fig. 8  Initial PHY configuration

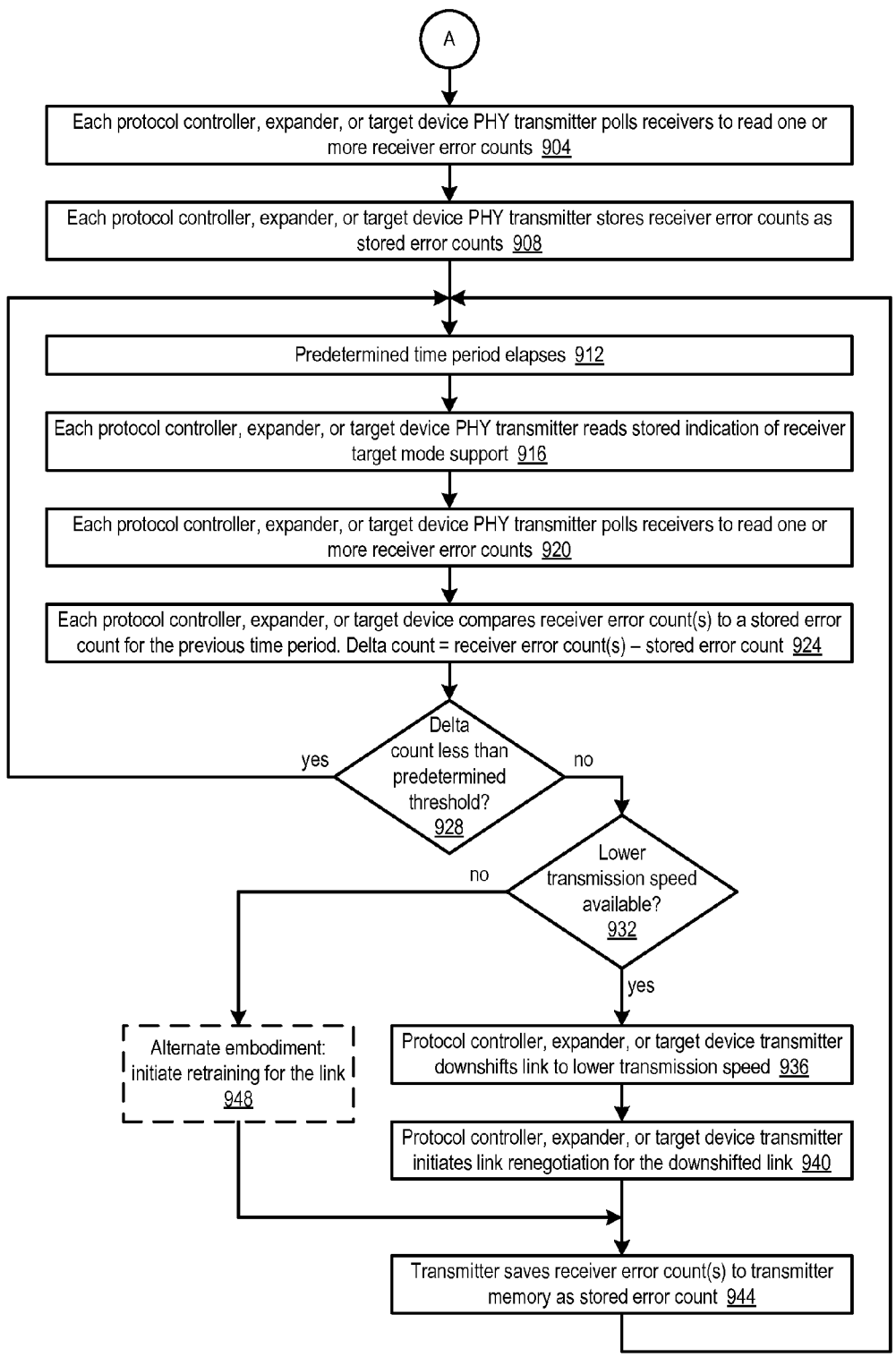
Fig. 9  PHY Downshift evaluation

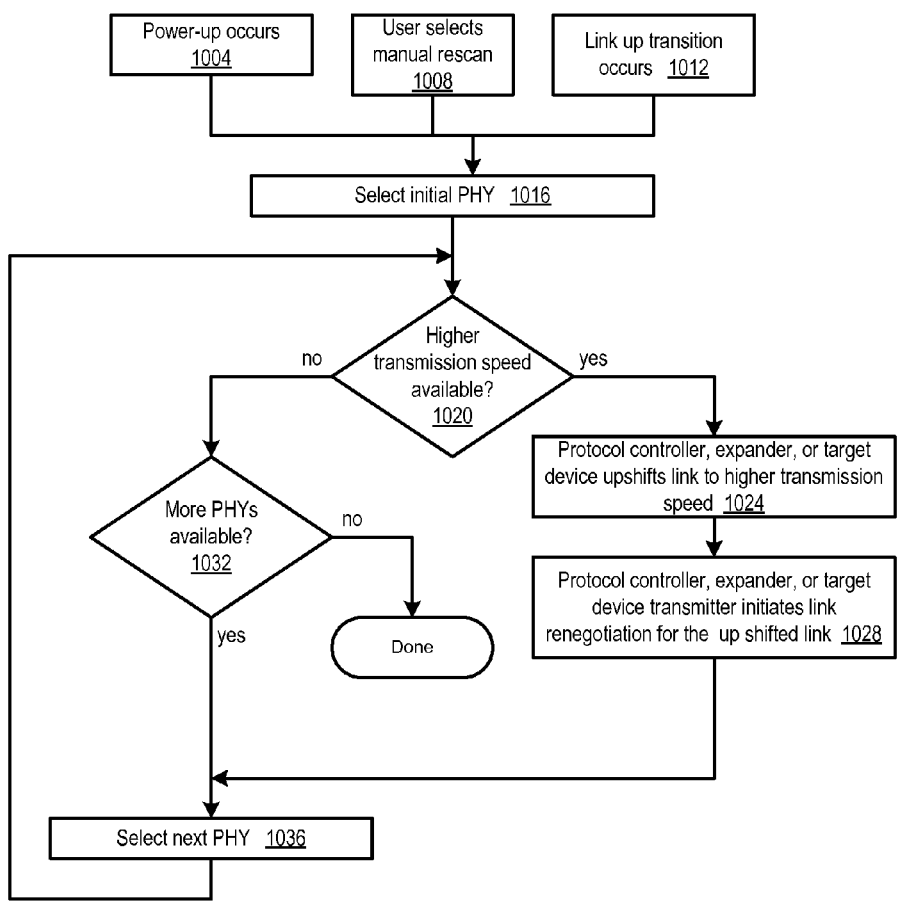
Fig. 10   PHY Upshift evaluation

US 8,458,527 B2

METHOD AND APPARATUS FOR SAS SPEED ADJUSTMENT

CROSS REFERENCE TO RELATED APPLICATION(S)

This application is a Continuation-in-Part of pending U.S. application Ser. No. 12/840,480, filed Jul. 21, 2010, entitled METHOD AND APPARATUS FOR SAS SPEED ADJUSTMENT, which is hereby incorporated by reference for all purposes and which were owned or subject to an obligation of assignment to Dot Hill Systems Corporation at the time the invention claimed herein was made. This application also claims the benefit of U.S. Provisional Application Ser. No. 61/301,440 filed Feb. 4, 2010, entitled METHOD AND APPARATUS FOR SAS SPEED ADJUSTMENT, which is hereby incorporated by reference for all purposes and which were owned or subject to an obligation of assignment to Dot Hill Systems Corporation at the time the invention claimed herein was made.

FIELD

The present invention is directed to computer interfaces. In particular, the present invention is directed to methods and apparatuses for optimizing data transfer rates between a transmitter and a receiver for reliable communication.

BACKGROUND

Serial-Attached-SCSI (SAS) systems are becoming more common in modern computing and data processing systems. SAS systems include SAS initiator devices and SAS target devices as does its parent, the Small Computer Systems Interface (SCSI). SAS target devices are typically storage devices, such as disk drives, that receive commands from SAS initiator devices, such as SAS host bus adapters in host computers or SAS I/O controllers in Redundant Arrays of Inexpensive Disks (RAID) controllers.

Implementations and uses of SAS are described in detail in the following documents, each of which is incorporated by reference in its entirety for all intents and purposes:

"Serial Attached SCSI—2.1 (SAS-2.1)", Revision 02, 19 May 2009. Working Draft, Project T10/2125-D, American National Standard Institute.

"Information technology—SAS Protocol Layer (SPL)", Revision 02, 19 May 2009. Working Draft, Project T10/2124-D, American National Standard Institute.

SAS systems are built on point-to-point serial connections between SAS devices. Each point-to-point connection is referred to as a link, and the two endpoints are individually referred to as a Physical Interface (PHY). A PHY contains a transmitter device (TX) and a receiver device (RX) and electrically interfaces to a link to communicate with another PHY at the other end of the link. The link includes two differential signal pairs; one pair in each direction. A SAS port includes one or more PHYs. A SAS port that has more than one PHY grouped together is referred to as a wide port, and the more than one link coupling the two wide ports are referred to as a wide link. Wide ports and wide links provide increased data transfer rates between SAS endpoints and enable multiple simultaneous connections to be open between a SAS initiator and multiple SAS targets.

The simplest SAS topology is a single SAS initiator having a SAS port that is connected by a single SAS link to a SAS port of a single SAS target. However, it is desirable in many applications, such as a high data availability RAID system, to enable one or more SAS initiators to communicate with multiple SAS target devices. In addition to initiators and targets, SAS includes a third type of device, expanders, which are employed in SAS systems to achieve more complex topologies. SAS expanders perform switch-like functions, such as routing, to enable SAS initiators and targets to communicate via the SAS point-to-point connections.

SUMMARY

The present invention is directed to solving disadvantages of the prior art. In accordance with embodiments of the present invention, a method for maintaining reliable communication on a bidirectional communication link is provided. A receiver on the bidirectional communication link detects an error and maintains a count of detected errors. A transmitter on the bidirectional communication link polls the receiver in order to determine the count of detected errors, and performs a downshift evaluation for the bidirectional communication link. In response to performing the downshift evaluation for the bidirectional communication link, the transmitter maintains a transmission speed of the bidirectional communication link if the downshift evaluation determines that forgoing transmission speed downshift is required for the bidirectional communication link, and reduces the transmission speed of the bidirectional communication link if the downshift evaluation determines that transmission speed downshift is required for the bidirectional communication link.

In accordance with other embodiments of the present invention, a system for maintaining reliable communication on a bidirectional communication link is provided. The system includes a transmitter, a receiver, and the bidirectional communication link, wherein the bidirectional communication link is coupled to the transmitter and the receiver. The receiver detects an error and maintains a count of detected errors. The transmitter polls the receiver in order to determine the count of detected errors. The transmitter performs a downshift evaluation for the bidirectional communication link, and in response to performing the downshift evaluation, the transmitter maintains the transmission speed of the bidirectional communication link if the downshift evaluation determines that forgoing a transmission speed downshift is required for the bidirectional communication link and the transmitter reduces the transmission speed of the bidirectional communication link if the downshift evaluation determines that a transmission speed downshift is required for the bidirectional communication link.

In accordance with still other embodiments of the present invention, a method for providing reliable point-to-point communications for a bidirectional communication link is provided. The method includes a transmitter determining if a first receiver supports target mode. If the first receiver does not support target mode, then polling a second receiver, by a transmitter, to determine the count of detected errors. The transmitter, the first receiver, and the second receiver are directly coupled to the bidirectional communication link. If the first receiver supports target mode, then the transmitter polls at least one of the first receiver and the second receiver to determine the count of detected errors. In response to the transmitter polling the count of detected errors in at least one of the first and second receivers, the transmitter performs a downshift evaluation. The transmitter determines if the downshift evaluation requires a downshift of a transmission speed for the bidirectional communication link, and maintains the bidirectional communication link transmission speed if the downshift evaluation does not require a reduction in transmission speed and reduces the bidirectional communication link transmission speed to a next lower link transmission speed if the downshift evaluation requires a reduction in transmission speed, if a lower bidirectional communication link transmission speed is available. The transmitter performs an up shift evaluation after one of a transmitter power up, a user selection of manual rescan, and a link-up transition.

Advantages of the present invention include an automatic means to improve reliable communications between a transmitter and a receiver. Another advantage is improving link throughput by automatically downshifting link transmission speed when an error threshold is met or exceeded. Another advantage is automatically checking to up shift link transmission speed when a power-up, manual rescan, or link-up sequence is detected. Another advantage of the present invention is a method for dynamically monitoring all links in a system between transmitters and receivers, and adjusting link transmission speed for each link independently in response to measured errors on each link. Yet another advantage of the present invention is a means to adjust link transmission speeds without direct initiator involvement in link transmission speed adjustment. However, an initiator may possibly be involved in reporting any transmission speed changes to a user. Yet another advantage of the present invention is capability to be used whether a receiver supports target mode, or not. Finally, another advantage of the present invention is the ability to monitor remote links and downshift remote links based on remote error counters.

Additional features and advantages of embodiments of the present invention will become more readily apparent from the following description, particularly when taken together with the accompanying drawings.

BRIEF DESCRIPTION OF THE DRAWINGS

FIG. 1c is a block diagram illustrating components of a third electronic data storage system incorporating one or more data storage systems in accordance with embodiments of the present invention.

FIG. 3 is a block diagram illustrating components of a storage enclosure in accordance with embodiments of the present invention.

FIG. 7 is an exemplary table illustrating storage of PHY parameters for a given combination of ten storage device types and seven target device slots in accordance with embodiments of the present invention.

FIG. 8 is a flowchart illustrating steps of PHY initial configuration in accordance with embodiments of the present invention.

FIG. 9 is a flowchart illustrating steps of downshift evaluation in accordance with embodiments of the present invention.

FIG. 10 is a flowchart illustrating steps of up shift evaluation in accordance with embodiments of the present invention.

DETAILED DESCRIPTION

Figure 1A:
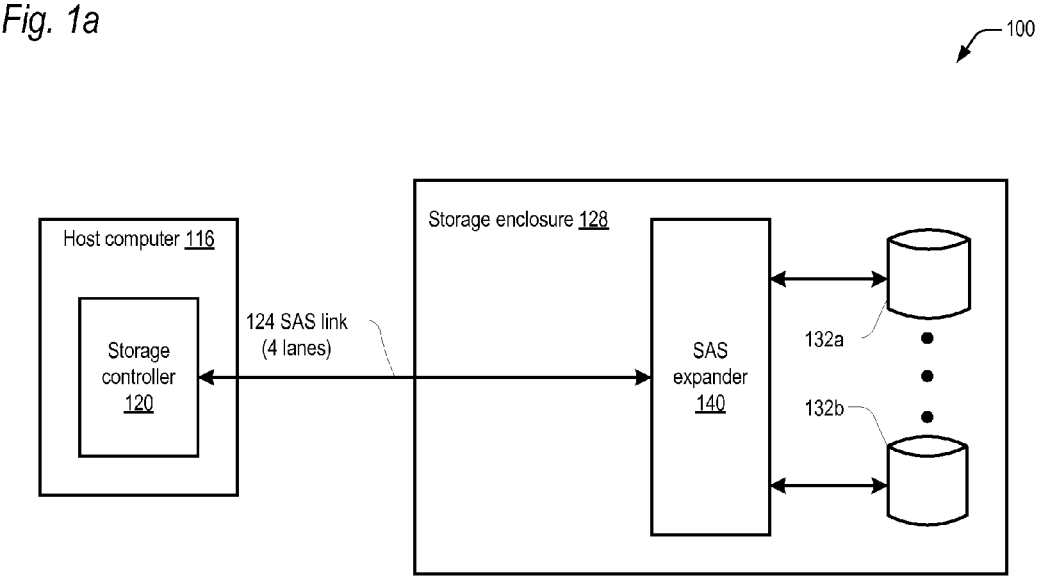
FIG. 1a is a block diagram illustrating components of a first electronic data storage system incorporating a data storage system in accordance with embodiments of the present invention.

The present inventors have observed various problems in complex topology systems having many paths between initiators and targets, where analog transmit parameters are controllable in the transmitters, but not necessarily in the receivers, of individual communication links between each initiator and target. Such systems include data storage systems having one or more storage controllers and many storage devices, and possibly two or more daisy-chained storage enclosures. Today, some link reliability problems have been observed with 6 Gigabit per second (Gb/s) SAS storage devices. Although Serial ATA (SATA) technology is currently limited to 3 Gb/s transfer rates, it is expected that SATA will have 6 Gb/s devices available in the future. Additionally, SAS storage device roadmaps extend to 12 Gb/s and beyond. The present inventors observed higher transmission error rates at the faster transmission speeds, especially over the SAS link between an expander and a storage device. Transmission errors due to signal degradation often results in the need to resend commands multiple times, thereby causing delays and effectively reducing link bandwidth. In severe cases, a target device may stop responding altogether, resulting in inaccessible data. Such a loss may, for example, cause a Redundant Array of Inexpensive Disks (RAID) array to become critical even when no actual storage device failure has occurred, which then requires time-consuming data reconstruction. Integrated circuit manufacturers of target mode integrated circuits (ICs) incorporate front end logic differently according to generation 2 SAS specification requirements. For example, drive front end RX DFE (Receive Decision Feedback Equalization) parameters, EQ-gain logic parameters, and various hardware and software receive algorithms vary between device manufacturers and components.

One approach to dealing with transmission errors is simply limit the frequency or triggering conditions for polling receiver error counters. By not examining error counters continuously, there is potentially less interruption to the system since fewer decisions based on error counter statistics will be made. However, this approach does not improve system reliability or reduce the number of actual errors. Although the present invention is described with respect to SAS technology, it should be understood that the system and processes of the present invention apply to any such point-to-point interface technology where multiple (2 or more) transmission speeds are supported. An example of such a technology is PCI Express.

Another approach for dealing with transmission errors is to empirically test every transmitter and receiver in every possible configuration (cable length, storage enclosure slot, type of initiator, etc), and either allow a user to input Physical Interface (PHY) parameters manually, or else allow a user to specify the cable type/length, enclosure slot position, and initiator type and from these entries select a set of PHY parameters that have been predetermined to operate reliably with the stated configuration. However, these approaches are prone to error in data entry and component identification. Additionally, this testing requires a significant amount of time-consuming testing for each such permutation—and increasing ongoing testing as new target devices, initiator types, connectors, cables, and storage enclosure midplanes or backplanes are introduced.

SAS specifications provide for link training in order to establish a link. Link training is a short series of data transfers between each transmitter and receiver across a link to determine if basic communication is possible on each SAS link, and is generally performed at power-up, after a detected topology change, or after manual reset of the initiator. Current solutions utilize a single set of PHY parameters for link training Typically, the link training PHY parameters are either an average of a known set of PHY parameters for various receivers, or the PHY parameters for a given receiver. However, neither is ideal since optimal parameters for a given receiver or target device are usually different than average PHY parameters or the parameters for a specific device if the actual receiver or target is different. Although SAS link training establishes if basic communication is possible, it is not an ongoing activity or establishes that reliable communication is possible on a link. Link training may possibly establish that basic communication is possible at a given transmission speed, but communicating at the given transmission speed may produce a higher than desired transmission error rate. Therefore, what is needed is a means to achieve ongoing reliable link communications between a transmitter and receiver, especially if communication conditions change between the transmitter and receiver.

Referring now to FIG. 1a, a block diagram illustrating components of a first electronic data storage system 100 incorporating a data storage system 128 in accordance with embodiments of the present invention is shown. The electronic data storage system 100 includes one or more host computers 116. Host computer 116 is generally a server, but could also be a desktop or mobile computer. Host computer 116 executes application programs that generate read and write requests to storage devices 132. Host computer 116 includes one or more storage controllers 120, although only a single storage controller 120 is illustrated for clarity. In one embodiment, storage controller 120 is a host bus adapter. In another embodiment, storage controller 120 is a RAID controller. In yet another embodiment, storage controller 120 represents a pair of dual redundant RAID controllers. Storage controller 120 may either be integrated on the motherboard of host computer 116, or may be an add-in board or other form of assembly in host computer 116. In one embodiment, host computer 116 executes the steps of the present invention illustrated in FIGS. 8-10.

Storage controller 120 transfers data to and from storage devices 132a, 132b in storage enclosure 128, over SAS link 124. In one embodiment, SAS link 124 is a wide SAS link, comprising 4 SAS lanes. Storage enclosure 128 includes one or more SAS expanders 140, which perform switching functions, and transfers data and commands between SAS link 124 and storage devices 132a, 132b. In general, the transmit and receive paths to storage devices 132 are single lane SAS connections. However, in the future it is possible each transmit or receive path could be a multiple lane SAS link. Each link between SAS expander 140 and storage devices 132 includes separate transmit and receive paths, and each storage device 132 generally has two ports for independent interconnection to different SAS expanders 140 as illustrated in FIG. 3. Storage devices 132 are storage peripheral devices including, but not limited to hard disk drives, solid state drives, tape drives, and optical drives. The term "target devices" includes storage devices 132.

Figure 1B:
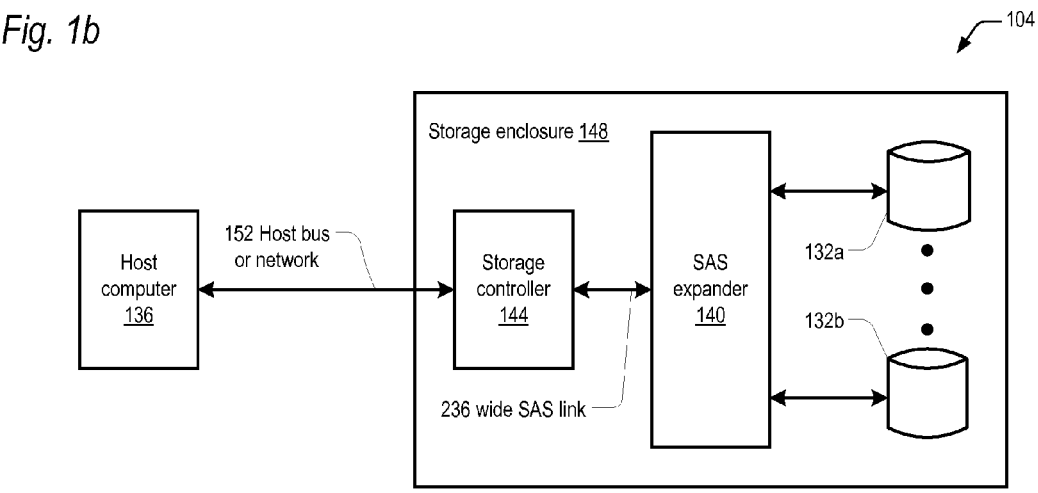
FIG. 1b is a block diagram illustrating components of a second electronic data storage system incorporating a data storage system in accordance with embodiments of the present invention.

Referring now to FIG. 1b, a block diagram illustrating components of a second electronic data storage system 104 incorporating a data storage system 148 in accordance with embodiments of the present invention is shown. Host computer 136 performs most of the functions previously described with respect to host computer 116, although the steps of FIGS. 8-10 are instead performed by storage controller 144. Storage enclosure 148 is similar to storage enclosure 128, except that one or more storage controllers 144 are present. Storage controller 144 is described in more detail with respect to FIG. 2. In one embodiment, storage controller 144 is a RAID controller. In another embodiment, storage controller 144 represents a pair of dual redundant RAID controllers. Host computer 136 communicates with storage enclosure 148, including storage controller 144, over host bus or network 152. Host bus or network 152 is any suitable bus or network that allows high speed data transfer between host computer 136 and storage controller 144. Examples of host bus or network 152 include, but are not limited to, SCSI, Fibre Channel, SSA, SCSI, SAS, iSCSI, Ethernet, Infiniband, ESCON, ATM, and FICON. In some embodiments, host bus or network 152 is a storage area network (SAN).

Referring now to FIG. 1c, a block diagram illustrating components of a third electronic data storage system 108 incorporating data storage systems 128 in accordance with embodiments of the present invention is shown. Electronic data storage system 108 is similar to electronic data storage system 100 of FIG. 1a, but additional storage enclosures 128b, 128c are provided to support additional storage devices 132c, 132d, 132e, and 132f. In one embodiment, storage controller 120 is a host bus adapter. In another embodiment, storage controller 120 is a RAID controller. In yet another embodiment, storage controller 120 represents a pair of dual redundant RAID controllers. In order to support additional storage enclosures 128b, 128c, SAS expanders 140 utilize daisy chain buses 156. Daisy chain bus 156 utilizes the same protocol as SAS link 124, and is generally a SAS wide bus having 4 SAS lanes. Daisy chain bus 156a interconnects SAS expander 140a and SAS expander 140b. Daisy chain bus 156b interconnects SAS expander 140b and SAS expander 140c. Daisy chain bus 156c interconnects SAS expander 140c and another storage enclosure 128, in a similar fashion to daisy chain buses 156a and 156b. In one embodiment, each storage enclosure 128 supports twelve storage devices 132 and each storage controller 120 supports up to 128 storage devices 132. However, in other embodiments each storage enclosure 128 may support more or fewer than 12 storage devices 132, and each storage controller 120 may support more or fewer than 128 storage devices 132.

Figure 1D:
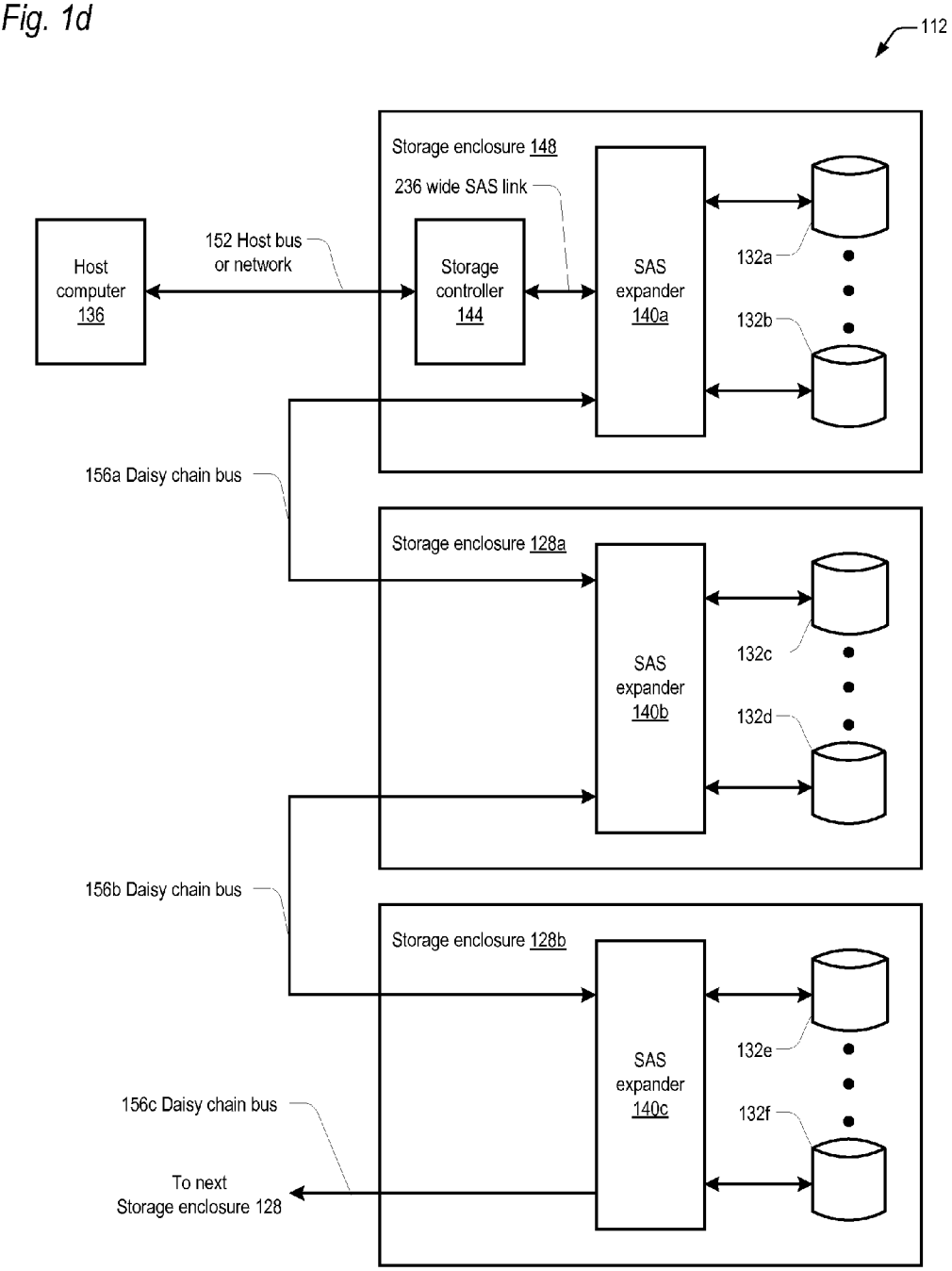
FIG. 1d is a block diagram illustrating components of a fourth electronic data storage system incorporating one or more data storage systems in accordance with embodiments of the present invention.

Referring now to FIG. 1d, a block diagram illustrating components of a fourth electronic data storage system 112 incorporating a data storage system 148 and multiple data storage systems 128 in accordance with embodiments of the present invention is shown. Electronic data storage system 112 is similar to electronic data storage system 104 of FIG. 1b, but additional storage enclosures 128b, 128c are provided to support additional storage devices 132c, 132d, 132e, and 132f. In one embodiment, storage controller 144 is a RAID controller. In another embodiment, storage controller 144 represents a pair of dual redundant RAID controllers. In order to support additional storage enclosures 128a, 128b, SAS expanders 140 utilize daisy chain buses 156. Daisy chain bus 156 utilizes the same protocol as SAS link 124, and is generally a SAS wide bus having 4 SAS lanes. Daisy chain bus 156a interconnects SAS expander 140a and SAS expander 140b. Daisy chain bus 156b interconnects SAS expander 140b and SAS expander 140c. Daisy chain bus 156c interconnects SAS expander 140c and another storage enclosure 128, in a similar fashion to daisy chain buses 156a and 156b. In one embodiment, each storage enclosure 128 supports twelve storage devices 132 and each storage controller 144 supports up to 128 storage devices 132. However, in other embodiments each storage enclosure 128 may support more or fewer than 12 storage devices 132, and each storage controller 144 may support more or fewer than 128 storage devices 132.

Figure 2:
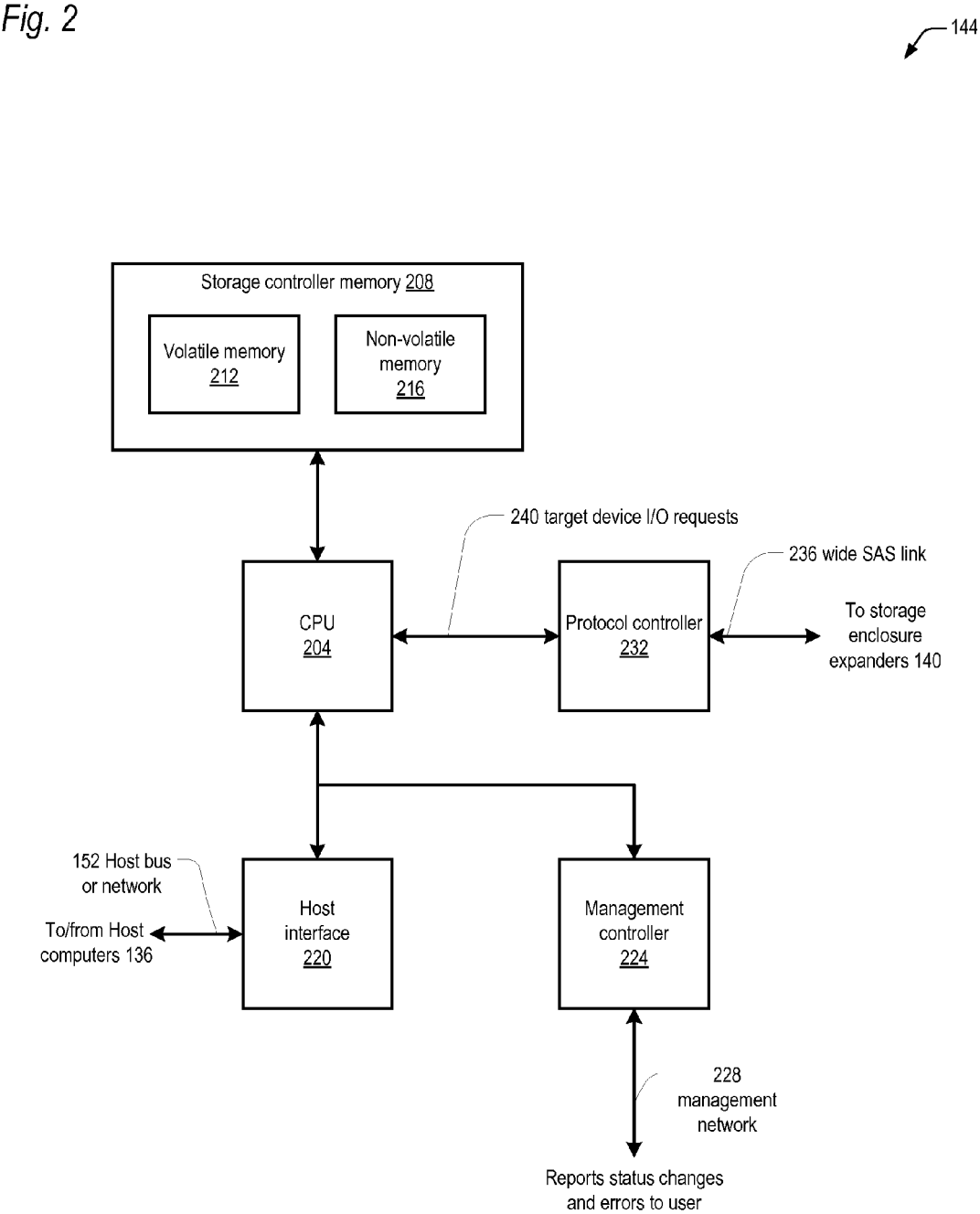
FIG. 2 is a block diagram illustrating components of a storage controller in accordance with embodiments of the present invention.

Referring now to FIG. 2, a block diagram illustrating components of a storage controller 144 in accordance with embodiments of the present invention is shown. Storage controller 144 includes a CPU 204, which executes stored programs that manage data transfers between host computers 136 and storage devices 132. CPU 204 includes any processing device suitable for executing storage controller 144 programs, such as Intel x86-compatible processors, embedded processors, mobile processors, and/or RISC processors. CPU 204 may include several devices including memory controllers, North Bridge devices, and/or South Bridge devices. Host computers 136 generate read and write I/O requests over host bus or network 152 to host Interface 220. Multiple host computers 136 may interact with storage controller 144 over host bus or network 152.

CPU 204 is coupled to storage controller memory 208. Storage controller memory 208 generally includes both non-volatile memory 216 and volatile memory 212. The non-volatile memory 216 stores the program instructions that CPU 204 fetches and executes, including program instructions for the processes of FIGS. 8-10. Examples of non-volatile memory 216 include, but are not limited to, flash memory, SD, EPROM, EEPROM, hard disks, and NOVRAM. Volatile memory 212 stores various data structures and in some embodiments contains a read cache, a write cache, or both. Examples of volatile memory 212 include, but are not limited to, DDR RAM, DDR2 RAM, DDR3 RAM, and other forms of temporary memory.

Storage controller 144 may have one host interface 220, or multiple host interfaces 220. Storage controller 144 has one or more protocol controller devices 232, which pass signals over one or more wide SAS links 236 to one or more expanders 140. In a preferred embodiment, protocol controller 232 is a SAS protocol controller 232. CPU 204 generates target device I/O requests 240 to protocol controller 232. In one embodiment, the protocol controller 232 is an LSI 2008 6 Gigabit per second (Gb/s) SAS controller and the expander 140 is a 36-port PMC PM8005 device. The electronic data storage systems 108, 112 may include multiple SAS paths 124, 236, 156 and multiple storage enclosures 128, 148.

Storage enclosures 128, 148 include a number of target devices 132. In one embodiment, storage enclosures 128, 148 include up to twelve (12) SAS storage devices 132. In another embodiment, storage enclosures 128, 148 include twenty-four (24) SAS storage devices 132. However, the number of target devices 132 may be less or more than twelve or twenty four. Multiple storage enclosures 128, 148 may be daisy chained with daisy chain buses 156a, 156b, 156c in order to increase the number of target devices 132 controlled by storage controllers 120, 144.

Expanders 140a, 140b, and 140c transfer data, commands, and status to and from target devices 132. In general, the transmit and receive paths to target devices 132 are single lane SAS connections. However, in the future it is possible each transmit or receive path could be a multiple lane SAS connection, or some other form of connection.

Each storage controller 144 also includes a Management controller 224. CPU 204 reports status changes and errors to the Management controller 224, which communicates status changes for storage controller 144 and errors to one or more users or administrators over management network 228. Management controller 224 also receives commands from one or more users or system administrators over management network 228. Management network 228 is any bus or network capable of transmitting and receiving data from a remote computer, and includes Ethernet, RS-232, Fibre Channel, ATM, SAS, SCSI, Infiniband, or any other communication medium. Such a communication medium may be either cabled or wireless. In some storage controllers 120 or 144, status changes and errors are reported to a user or administrator through host interface 220 over host bus or network 152.

As can be seen in FIGS. 1c or 1d, there may be many links between endpoints. For example, in FIG. 1d, storage controller 144 may transmit an I/O request to storage device 132e. This requires a transfer from protocol controller 232 through expander 140a over a wide SAS link 236, across daisy chain bus 156a, SAS expander 140b, daisy chain bus 156b, SAS expander 140c to disk 132e in storage enclosure 128b.

Referring now to FIG. 3, a block diagram illustrating components of a storage enclosure 128, 148 in accordance with embodiments of the present invention is shown. In the case of a storage enclosure 148, storage controller(s) 144 are not illustrated in FIG. 3 for simplicity. However, it should be understood that storage controller(s) 144 interconnect to expander 140 through wide SAS link 236, as shown in FIGS. 1b and 1d. The present invention deals with improving data transfer reliability on bidirectional communication links, and will be described in more detail with respect to FIGS. 5a, 5b, and 6. A system may utilize the present invention on many such SAS links, resulting in system-level link reliability improvements. Although a protocol controller 232 is the initiator for any I/O request addressed to a specific target device 132, the SAS signals pass through at least one expander 140.

The storage enclosure 128, 148 of FIG. 3 includes a plurality of target devices 132 interconnected to one or more expanders 140 through a midplane 336, which may be designed to support a given number of target devices 132. Protocol controller 232 is the initiator, and target devices 132 are storage devices. In one embodiment, the midplane 336 supports 12 target devices 132. In another embodiment, the midplane 336 supports 24 target devices 132. The target devices 132 are typically individually hot-pluggable to aid in quick field replacement, in conjunction with RAID or redundant storage arrangements. For simplicity, only four target devices 132a-132d are shown, with each target device 132 having a separate transmit and receive path to the midplane 336. Target devices 132 are typically dual-ported, with two sets of transmit and receive paths to expander PHYs 312. However, only one transmit and receive path is shown interconnected to expander PHYs 312 for each target device 132 for simplicity. Target devices 132 may have any number of ports, from one to four or more.

Expander 140 includes an expander CPU 304 and expander memory 308, and multiple physical interfaces or PHYs 312a-312d. Each PHY 312 has a transmit port 316 and a receive port 320. Each PHY 312 is therefore coupled to a different port of a target device 132 through the midplane 336. For example, transmit port 316c and receive port 320c of PHY 312c are coupled to target device 132c. Connections to target devices 132 typically have only a single SAS lane per port, with dual ports as stated previously and illustrated in FIGS. 3 and 5a.

Storage enclosure 128, 148 has a non-volatile memory 324 coupled to expander 140. Examples of non-volatile memory 324 include, but are not limited to, flash memory, SD, compact flash, EPROM, EEPROM, and NOVRAM. The non-volatile memory 324 stores program instructions that are executed by the expander CPU 304 of expander 140. The program instructions are organized as expander boot code 328 and customer-specific code 332. The expander boot code 328 consists of program instructions to internally configure the expander 140 and boot-time diagnostics to make sure the expander 140 is internally operational. The customer-specific boot code 332 consists of program instructions that initially configure PHY 312 parameters and perform the process steps of FIGS. 7-10. The expander 140 functions after power-on by reading expander boot code 328 and customer-specific code 332 into expander memory 308. Once both sets of code are stored in expander memory 308, expander CPU 304 first executes the expander boot code 328 followed by the customer-specific code 332. The processes of FIGS. 7-10 are executed by CPU 204 of storage controller 144 or the CPU 304 of Expander 140, a CPU in protocol controller 232, or a CPU in any of target devices 132.

With respect to FIG. 3, target devices 132 detect errors. Expander 140 polls target devices 132 individually, performs downshift/up shift evaluations, and in some embodiments reports changes in transmission speed to the upstream protocol controller 232 over wide SAS link 236. The protocol controller 232 then reports the transmission speed changes to CPU 204. CPU 204 transmits errors to Management controller 224, which then reports errors to a user or system administrator over management network 228. In other embodiments, transmission speed change events are stored locally in expander memory 308 or storage controller memory 208, but are not asynchronously reported to a user or system administrator unless polled. In yet other embodiments, transmission speed change events are not stored, but current link transmission speeds are reported to a user or system administrator when a transmitter polls a PHY 312.

Each of these individual links between a PHY port 316, 320 and a target device 132 has different routing through semiconductor devices, cables, connectors, PCB traces and so on. Therefore, path lengths and electrical characteristics will vary between links. In addition to path length variations, other factors affect electrical performance of links. Manufacturing differences between components, connector fit variances, PCB trace impedance, and inconsistent PCB routing contribute to electrical differences between paths. When a component is marginal or goes bad, such as a SAS device that generates logical errors, it may be caused by improper PHY analog settings, a bad or marginal PHY, or a bad or marginal link, which may include bad or marginal cables, connectors, or printed circuit board assembly traces. Some of the manifestations of the faulty components include intermittent communication errors between SAS devices, spurious transmit errors, or complete loss of a SAS link. Another manifestation is the inability for a SAS initiator to see a SAS target in the topology due to intermittent failures that cause a SAS device to work sufficiently well to be allowed into the topology, but to be sufficiently faulty to prevent effective communication between SAS devices. These problems are exacerbated at higher SAS transfer speeds. For example, today SAS devices support transfer rates of 1.5, 3, or 6 Gb/s. Soon, devices will be available that can support up to 12 Gb/s transfer rates. Transfer rates well beyond 12 Gb/s are expected to be achievable in the future.

One method of dealing with errors due to signal integrity problems between expanders 140 and target devices 132 is to attempt to identify the faulty component and send a command through either the SAS domain or other bus such as an Inter-Integrated Circuit ($I^2C$) or Universal Asynchronous Receiver/Transmitter (UART) bus to disable, or bypass, various PHYs 312 in the domain in a trial-and-error approach until the initiator has isolated the problem. However, some failure scenarios cannot be satisfactorily remedied by this approach. For example, assume a component fails in an intermittent fashion, such as a marginal PHY 312, that causes an expander 140 to first detect that a SAS link is operating properly, to subsequently detect that the link is not operating properly, and to continue this sequence for a relatively long time. According to the SAS standard, the expander 140 is required to transmit a BROADCAST primitive on each of its SAS ports to notify other SAS devices of the change of status within the SAS domain. Each time a SAS initiator receives the BROADCAST primitive it is required to perform a SAS discover process to discover the device type, SAS address, and supported protocols of each SAS device in the SAS domain and to configure routing tables within the expanders 140 as needed. The SAS discover process can take a relatively large amount of time to complete. If an expander 140 transmits BROADCAST primitives due to the operational-to-non-operational link transitions according to a period that is comparable to the SAS discover process time, then consequently the SAS initiator may be unable to effectively send commands though the SAS domain to identify and remedy the problem. Even if the initiator is successful in identifying and fixing the problem, the SAS domain may have been effectively unavailable for providing user data transfers for an unacceptable length of time.

Another potential problem in SAS systems is the fact that the SAS standard allows cables that connect SAS PHYs 312 to be anywhere within a relatively large range of lengths. For example, the SAS specification currently allow for cable lengths up to eight meters. The length of the SAS cable may significantly impact the quality of the signals received on the SAS link between two SAS PHYs 312. What is needed is a solution to improve the data availability in SAS systems, which are subject to the foregoing problems.

Figure 4A:
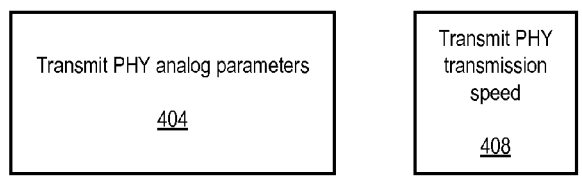
FIG. 4a is a block diagram illustrating programmable transmit PHY parameters in accordance with embodiments of the present invention.

Referring now to FIG. 4a, a block diagram illustrating programmable transmit PHY parameters 400 in accordance with embodiments of the present invention is shown. Each PHY 312 transmits data and commands through a transmit port 316 to a receive port 320 in a different PHY 312. Associated with each transmit port 316 is a set of transmit PHY analog parameters 404. Such parameters control analog signaling on the link 124, 236, or 156 between the transmit port 316 and the receive port 320. The actual parameters used may vary somewhat between suppliers of circuitry containing one or more transmit ports 316. However, the transmit analog PHY parameters 404 may include pre-drive bias, transmit pre-emphasis, transmit voltage levels, termination resistance selection, channel equalization, DC gain, and output slew rate, among other parameters. Each transmit port 316 in a PHY 312 may be configurable with a different set of transmit PHY analog parameters 404, in order to optimize signaling between the transmit port 316 and the receive port 320. Signal optimization provides more reliable communication between the transmit port 316 and the receive port 320 to account for differences in cable length, receiver analog parameters, connector quality, and so on.

Also associated with each transmit port 316 in a PHY 312 is a transmit PHY transmission speed 408 parameter. This programmable parameter sets the operating speed of the associated transmit port 316, and is varied by the transmitter according to the process of FIGS. 7-10.

Figure 4B:
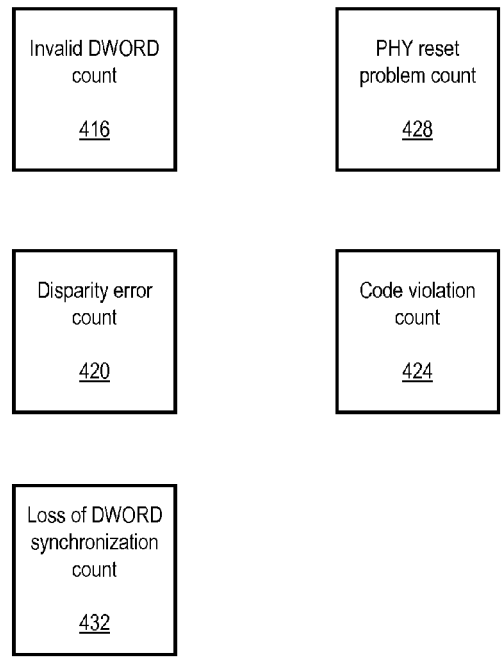
FIG. 4b is a block diagram illustrating PHY receive errors in accordance with embodiments of the present invention.

Referring now to FIG. 4b, a block diagram illustrating PHY 312 receive errors in accordance with embodiments of the present invention is shown. Associated with each receive port 320 is a set of error counters 412 that maintain current counts of various types of receive errors. In one embodiment, the counters 412 are 32-bit free running counters. Although more counters may be provided than error counters 412, at least one of invalid DWORD count 416, disparity error count 420, loss of DWORD synchronization count 432, PHY reset problem count 428, and code violation count 424 is provided. Error counters 412 are read by the transmitter according to block 912 of FIG. 9.

Figure 5A:
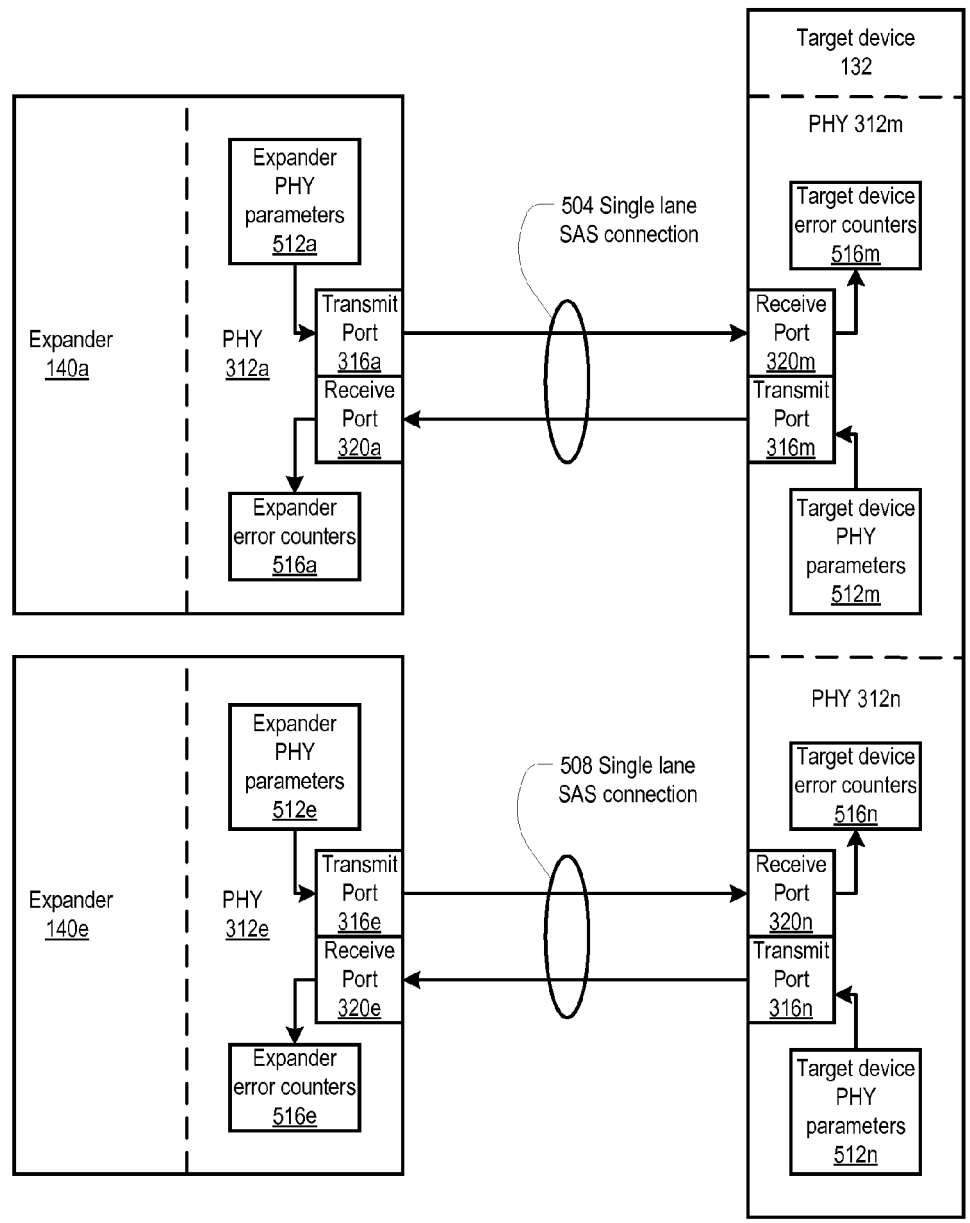
FIG. 5a is a block diagram illustrating communication paths between a dual-ported target device and two expanders in accordance with embodiments of the present invention.

Referring now to FIG. 5a, a block diagram illustrating communication paths between a dual-ported target device 132 and two expanders 140a, 140e in accordance with embodiments of the present invention is shown. FIG. 5a illustrates in more detail portions of system of FIG. 3 and operation of the present invention between a dual ported target device 132 and dual expanders 140a, 140e. Such an arrangement would be commonly found within a storage enclosure 128, 148 providing redundant connections to target devices 132. It should be understood that each expander 140 has multiple PHYs 312, a CPU 304, volatile 324 and non-volatile 308 memory, and connections to various buses 236, 156, which are not shown for clarity. Additionally, target device 132 generally has a CPU, volatile and non-volatile memory, storage media (magnetic disk, optical or tape memory, solid state memory, etc) and other components that are not shown for clarity.

Each expander 140a, 140e has a PHY 312a, 312e including a transmit port 316a, 316e, a receive port 320a, 320e, storage for PHY parameters 512a, 512e, and expander error counters 516a, 516e. PHY parameters 512a, 512e control the operation of transmit ports 316a, 316e, respectively, and the specific PHY parameters stored in 512a, 512e are selected from the PHY parameter table described with respect to FIG. 7. PHY parameters 512 include transmit PHY analog parameters 404 as well as transmit PHY transmission speed 408. Each PHY 312a, 312e also has expander error counters 516a, 516e coupled to receive ports 320a, 320e, respectively. Expander error counters 516a, 516e include one or more of error counters 412 of FIG. 4b.

Target device 132 has a similar arrangement of transmit port 316, receive port 320, PHY parameters 512, and error counters 516 to expanders 140a, 140e. Although target device 132 is shown having two PHYs 312m and 312n, it should be understood that target device 132 may only have a single PHY 312 or two or more PHYs 312. PHY 312m of target device 132 is coupled to expander 140a PHY 312a by single lane SAS link 504. Single lane SAS link 504 provides one point-to-point communication path between transmit port 316a of PHY 312a of expander 140a and receive port 320m of PHY 312m of target device 132. Single lane SAS link 504 also provides one point-to-point communication path between transmit port 316m of PHY 312m of target device 132 and receive port 320a of PHY 312a of expander 140a. Therefore, bidirectional communication between expander 140a PHY 312a and target device 132 PHY 312m is provided on two separate unidirectional links, where each unidirectional link is a differential pair. Single-lane SAS link 508 is arranged the same as single-lane SAS link 504, and as shown in FIG. 5a. It should be understood that the term bidirectional communication link applies to any of links 504, 508, 652, 656, and 660 and individual lanes of links 124, 236, or 156.

It is important to note that each end of each link 504, 508 has a receive port 320. Therefore, each receive port 320 has associated error counters 516, and the circuitry and instructions to implement the processes of FIGS. 7-10. Therefore, any such device having a PHY 312 may have the ability to downshift or up shift transmission speed independently and autonomously for any such links in the device. However, it is not necessarily required that every PHY 312 or device have such capability. For example, it is possible that a target device 132 may not include the present invention while the various expanders 140 and protocol controller 232 utilize the present invention. Advantageously, however, it is desirable for all devices to include the present invention in order to utilize the communication reliability improvements the present invention provides. Various operating features of transmit-side or receive-side error counters 516 and local and remote links are discussed with respect to FIG. 6.

Figure 5B:
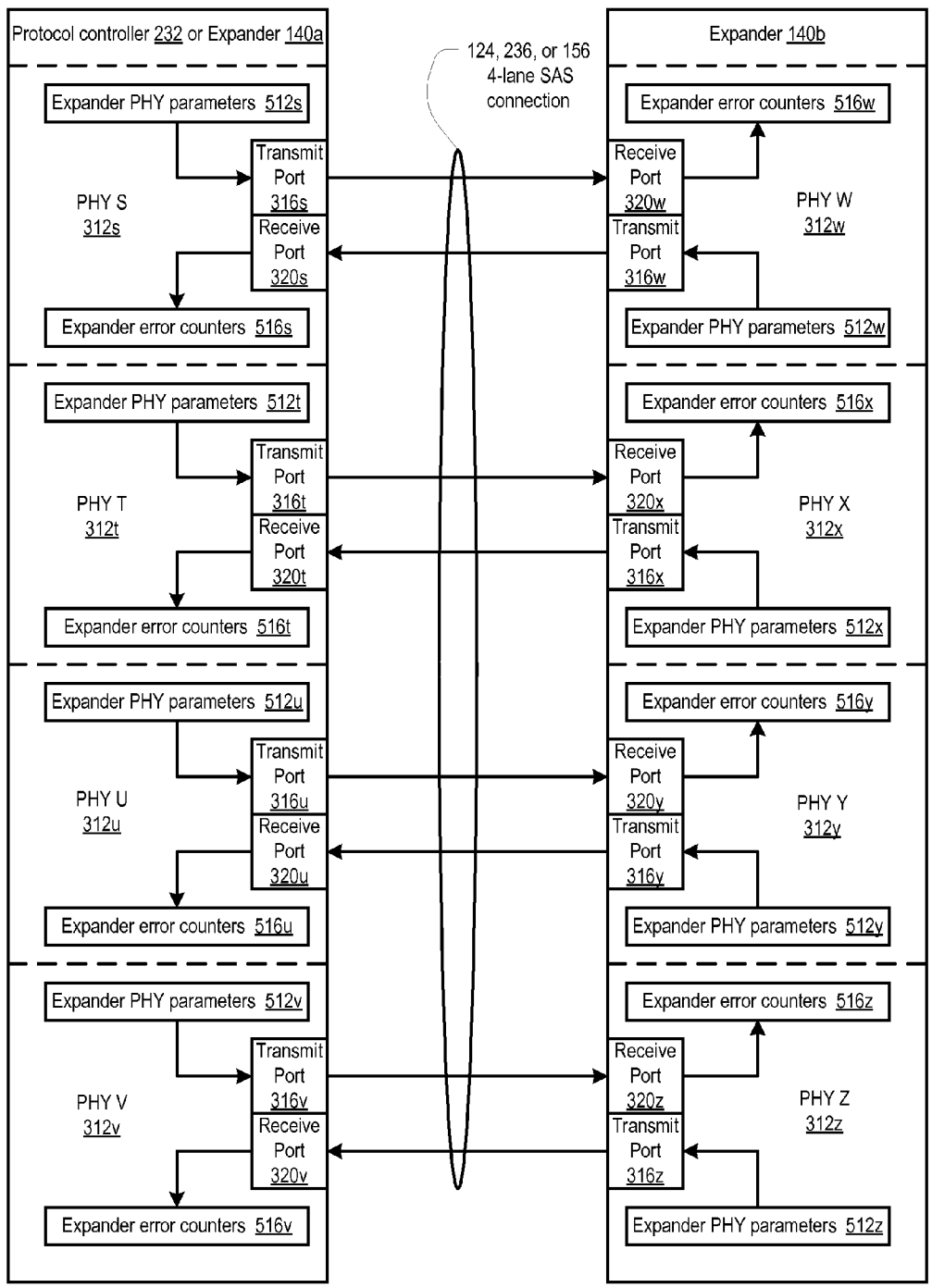
FIG. 5b is a block diagram illustrating communication paths between a protocol controller or first expander and a second expander in accordance with embodiments of the present invention.

Referring now to FIG. 5b, a block diagram illustrating communication paths between a protocol controller 232 or first expander 140a and a second expander 140b in accordance with embodiments of the present invention is shown. FIG. 5b illustrates a multi-lane point-to-point communication path between a protocol controller 232 and an expander 140b or an expander 140a and another expander 140b. The multi-lane communication path is representative of SAS link 124 in FIGS. 1a and 1c, wide SAS link 236 of FIGS. 1b, 1d, 2, and 3, and daisy chain bus 156 of FIGS. 1c, 1d, and FIG. 3.

The lanes of multiple communication paths of FIG. 5b individually operate identically to the individual communication paths of FIG. 5a. In one embodiment, each of lanes of the multiple communication paths of FIG. 5b operates independently to any of the other lanes of FIG. 5b. In that case, if protocol controller 232 or expander 140a decides to downshift the transmission speed for transmit port 316u in PHY U 312u, the transmission speed for transmit port 316s in PHY S 312s, transmit port 316t in PHY T 312t, and transmit port 316v in PHY V 312v are unaffected and will only transition to a faster or slower transmission speed based on error counters 516s/516w, 516t/516x, and 516v/516z, respectively. In another embodiment, each of the multiple communication paths of FIG. 5b does not operate independently to any of the other communication paths of FIG. 5b. In other words, if protocol controller 232 or expander 140a determines that a transmission speed downshift is required for transmit port 316u of PHY U 312u, not only would protocol controller 232 or expander 140a downshift the transmission speed for PHY U, but the transmission speeds for PHYs S 312s, T 312t, and V 312v would be similarly downshifted at the same time—regardless of error counts 516s/516w, 516t/516x, and 516v/516z.

Although four lanes are illustrated in FIG. 5b, it should be understood that the organization and operation described with reference to FIG. 5b apply to any multi-lane communication path regardless of how many lanes are actually present.

Figure 6:
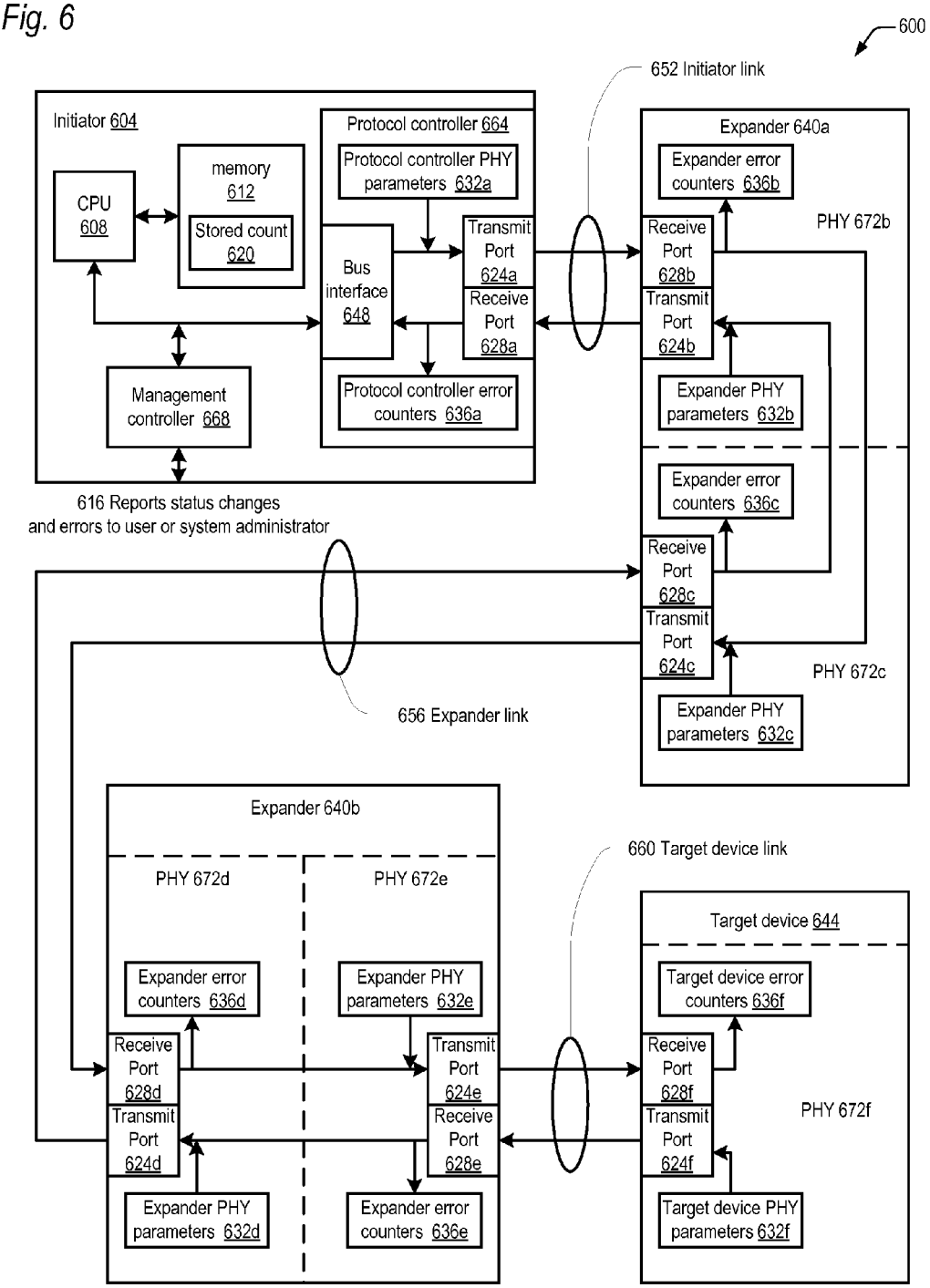
FIG. 6 is a block diagram illustrating exemplary hardware components in accordance with embodiments of the present invention.

Referring now to FIG. 6, a block diagram 600 illustrating exemplary hardware components in accordance with embodiments of the present invention are shown. FIG. 6 includes a representative example of components between a command initiator 604 and a target device 644. Therefore, the key elements in the command and data path within the environment of the present invention are illustrated.

Initiator 604 represents the entity that generates commands or data to target device 644. In one embodiment, initiator 604 is a host bus adapter 120. In another embodiment, initiator 604 is storage controller 120 or 144. Initiator 604 includes CPU 608 that executes various programs to transfer data and commands to and from target device 644. CPU 608 is any device that executes stored programs, including a CISC or RISC processor, microcontroller, or other device. Examples of CPU 608 include, but are not limited to, X86-compatible processors and PowerPC processors. CPU 608 transfers I/O requests or requests for status to a protocol controller 664 that converts the I/O requests or requests for status through transmit port 624a to receive port 628b across a path of initiator link 652. CPU 608 receives requested data or status from target device 644 through receive port 628a from transmit port 624b across a path of initiator link 652.

Initiator 604 includes memory 612 for storing programs and various data parameters, including a stored count 620, for each lane 652 controlled by protocol controller 664. Initiator 604 also includes management controller 668. Management controller 668 is coupled to CPU 608 and protocol controller 664, and interfaces with a user or system administrator. In the context of the present invention, management controller 668 reports status changes and errors 616 to the user or system administrator, and receives commands to perform a manual reset or a manual rescan. Although not shown for simplicity, each transmitter 604, 640a, 640b, 644 includes a stored error count 620 for each transmitter PHY 672.

The protocol controller 664 is a semiconductor device that converts logical commands from the CPU 608 into physical commands that a target device 644 is able to process. In one embodiment, the protocol controller 664 is an LSI Logic AS2008 PCI Express SAS protocol controller. Protocol controller 664 includes one or more PHYs 672, although the PHY 672 itself is not shown for simplicity. It should be understood that protocol controller PHY parameters 632a, transmit port 624a, receive port 628a, and protocol controller error counters 636a are all within a PHY 672.

The term "command initiator" or "transmitter" refers jointly to the CPU 608, memory 612 and the protocol controller 664, which initiate commands to target devices 644. A "transmitter" may also be the processing element, memory, and PHY circuitry that transmit data, commands, or anything else to a "receiver". In the case of expanders 140 or 640, the processing element would be expander CPU 304, memory 308, 324, and the PHY circuitry would be PHYs 312 or 672. A target device 644 may also be a "transmitter" to an expander 140, 640. On each link 652, 656, 660, there are two transmitters: on link 652 one transmitter comprises transmit port 624a and PHY parameters 632a and the other transmitter comprises transmit port 624b and PHY parameters 632b, on link 656 one transmitter comprises transmit port 624c and PHY parameters 632c and the other transmitter comprises transmit port 624d and PHY parameters 632d, and on link 660 one transmitter comprises transmit port 624e and PHY parameters 632e and the other transmitter comprises transmit port 624f and PHY parameters 632f.

The term "receiver" is used herein to denote a device containing a receive port 320, 628, and the circuitry associated with a receive port 320, 628 that enables a node to receive data or commands, determine if an error occurred, and count any detected receive data errors. On each link 652, 656, 660, there are two receivers: on link 652 one receiver comprises receive port 628a and error counters 636a and the other receiver comprises receive port 628b and error counters 636b, on link 656 one receiver comprises receive port 628c and error counters 636c and the other receiver comprises receive port 628d and error counters 636d, and on link 660 one receiver comprises receive port 628e and error counters 636e and the other receiver comprises receive port 628f and error counters 636f.

For simplicity, a midplane 336 or storage enclosure 128, 148 is not shown between the initiator 604 and the target device 644, although a midplane 336 or storage enclosure 128, 148 may possibly be present. The target device 644 represents a target device 132, or any such device that represents the terminus of link communication. For simplicity of illustration, only a single PHY 672f is shown in target device 644, although additional PHYs 672 may be present, such as dual PHYs 312 in target device 132 of FIG. 3.

PHY 672 is a physical interface, which generates standard analog signaling to the target device 644, and receives error information from a downstream device. Expanders 640 provide switching functionality between one or more protocol controllers 664, and one or more target devices 644. For simplicity, multiple protocol controllers 664, and multiple target devices 644 are not illustrated in FIG. 6. Among the various functions provided in the PHY 672 is designating the transmission speed 408 between the transmit port 624 and the corresponding receive port 628 (e.g. between transmit port 624c and receive port 628d).

Only two PHYs 672 are shown per expander 640 FIG. 6, although many PHYs 672 (and expanders 640) may be in the communication path between protocol controller 664 and target device 644. For example, wide SAS links 124, 236, and 156 incorporate four PHYs 312, 672 on each end of links 652, 656, and as shown in FIG. 5b. Although expander 640b is generally understood to be in the same storage enclosure 128, 148 as target device 644, expander 640a may be part of storage controller 120, 144 along with initiator 604, in a RAID head or separate storage enclosure 128, 148 from expander 640b and target device 644.

Protocol controller 664 communicates with target device 644 by generating transmissions to the target device 644. Transmissions include anything sent by the transmitter, including data, commands, or idle frames. Protocol controller 664 sends transmissions to expander 640a over initiator link 652 at the speed designated by transmission speed 408 in protocol controller PHY parameters 632a. If the receive port 628b in PHY 672b detects an error in the transmission, expander 640a increments expander error counters 636b. Expander 640a will then transfer the transmission to transmit port 624c of PHY 672c. PHY 672c will then transmit the transmission from transmit port 624c to receive port 628d of PHY 672d of expander 640b over expander link 656 at the speed designated by transmission speed 408 in expander PHY parameters 632c. If the receive port 628d in PHY 672d detects an error in the transmission, expander 640b increments expander error counters 636d. Expander 640b will then transfer the command, data, or idle frame to transmit port 624e of PHY 672e. PHY 672e will then transmit the command, data, or idle frame from transmit port 624e to receive port 628f of PHY 672f of target device 644 over target device link 660 at the speed designated by transmission speed 408 in expander PHY parameters 632e. If the receive port 628f in PHY 672f detects an error in the transmission, target device 644 increments expander error counters 636f.

Target device 644 responds to protocol controller 664 by generating a transmission to the protocol controller 664. Target device 644 sends data, status, or idle frames to expander 640b over target device link 660 at the speed designated by transmission speed 408 in target device PHY parameters 632*f*. If the receive port 628*e* in PHY 672*e* detects an error in the data, expander 640*b* increments expander error counters 636*e*. Expander 640*b* will then transfer the data, status, or idle frames to transmit port 624*d* of PHY 672*d*. PHY 672*d* will then transmit the data, status, or idle frames from transmit port 624*d* to receive port 628*c* of PHY 672*c* of expander 640*a* over expander link 656 at the speed designated by transmission speed 408 in expander PHY parameters 632*d*. If the receive port 628*c* in PHY 672*c* detects an error in the transmission, expander 640*a* increments expander error counters 636*c*. Expander 640*a* will then transfer the data, status, or idle frames to transmit port 624*b* of PHY 672*b*. PHY 672*b* will then transmit the data, status, or idle frames from transmit port 624*b* to receive port 628*a* of protocol controller 664 of initiator 604 over initiator link 652 at the speed designated by transmission speed 408 in expander PHY parameters 632*b*. If the receive port 628*a* in protocol controller 664 detects an error in the transmission, protocol controller 664 increments protocol controller error counters 636*a*.

For each transmitter, there are two ways that error counters may be read. The first is if the normal receiver supports target mode and the second is if the normal receiver does not support target mode. The normal receiver is the PHY 672 receive port that a transmission from the transmitter is directed to. For example, if protocol controller 664 is the transmitter, then receive port 628*b* of PHY 672*b* of expander 640*a* is the normal receiver. If PHY 672*d* of expander 640*b* is the transmitter, then receive port 628*c* of PHY 672*c* of expander 640*a* is the normal receiver.

Each transmitter keeps track of whether all connected normal receivers support target mode. Target devices 644 by their very nature support target mode, while protocol controllers 232, 644 or expanders 140, 640 may or may not support target mode. If a given normal receiver supports target mode, then the corresponding transmitter is able to read the error counters 636 in the normal receiver. In one embodiment, if the normal receiver supports target mode, the corresponding transmitter reads only the target device error counters. Therefore, if PHY 672*e* of expander 640*b* is the transmitter, it will read target device error counters 636*f* in PHY 672*f* of target device 644, since target device 644 inherently supports target mode. In a preferred embodiment, if the normal receiver supports target mode, the corresponding transmitter not only reads the target device error counters, but it will also read the error counters within the same PHY as the transmitter. Therefore, if PHY 672*d* of expander 640*b* is the transmitter, it will read both expander error counters 636*c* and 636*d* if expander 640*a* supports target mode.

If a given normal receiver does not support target mode, then the corresponding transmitter does not read the error counters 636 in the normal receiver, and instead reads the error counters in the receiver of the same PHY 672 as the transmitter. Therefore, if PHY 672*b* of expander 640*a* is the transmitter, and it has determined that normal receiver receive port 628*a* of protocol controller 664 does not support target mode, PHY 672*b* will not attempt to read protocol controller error counters 636*a* and instead will read expander error counters 636*b* of PHY 672*b*. The transmitter is able to always read error counters for the link 652, 656, 660 directly attached to the transmitter, regardless of whether the normal receiver supports target mode or not.

Because of the ability for a transmitter to always read error counters regardless of target mode support, the present invention includes the ability for a transmitter to read remote error counters and perform downshift evaluation for a remote link. A remote link is any link not directly connected to a given transmitter that is "downstream" from the transmitter. "Downstream" means in the path of transmit direction from the transmitter. Therefore, if protocol controller 664 is the transmitter, expander link 656 and target device link 660 are remote links. If PHY 672*d* of expander 640*b* is the transmitter, then initiator link 652 is a remote link. Target device link 660 is not considered a remote link for PHY 672*d*, since it is not downstream from PHY 672*d* and PHY 672*d* transmits toward protocol controller 664.

As an example of the remote aspect of the invention, assume that expander 640*a* supports target mode, but protocol controller 664 does not. PHY 672*d* as the transmitter reads expander error counters 636*c* and 636*d* for expander link 656, and expander error counters 636*b* for initiator link 652. Protocol controller error counters 636*a* are not available to PHY 672*d* since protocol controller 664 does not support target mode. Not only is PHY 672*d* able to downshift expander link 656 based on expander error counters 636*c* or 636*d*, it is also able to downshift initiator link 652 based on expander error counters 636*b*. PHY 672*d* downshifts expander link 656 by reducing the expander link 656 transmission speed in expander PHY parameters 632*d*. PHY 672 downshifts initiator link 652 by reducing the initiator link 652 transmission speed in expander PHY parameters 632*b*.

Whenever a transmitter either downshifts or up shifts any link transmission speed, link speed renegotiation occurs on that link. Therefore, for example, if transmitter PHY 672*d* downshifts the portion of expander link 656 between transmit port 624*d* and receive port 628*c* from 6 Gb/s to 3 Gb/s, link renegotiation causes the portion of expander link 656 between transmit port 624*c* and receive port 628*d* to also downshift from 6 Gb/s to 3 Gb/s.

It should be noted that error counters 636 may represent a count of only one type of error, or a sum of a count of a plurality of error counters, as explained with reference to error counters 412 of FIG. 4*b*. In a preferred embodiment, error counters 636 store an invalid DWORD count. In another embodiment, error counters 636 store the sum of invalid DWORD count 416, disparity error count 420, loss of DWORD synchronization count 432, PHY reset problem count 428, and code violation count 424. In yet another embodiment, error counters 636 store the sum of a plurality of error counts 412 but less than all error counts 412.

Referring now to FIG. 7, an exemplary table 404 illustrating storage of PHY 312, 672 parameters for a given combination of ten target device types 708 and seven storage enclosure slots 704 in accordance with embodiments of the present invention is shown. Such a table could be used to initially configure PHY 312, 672 parameters for all PHYs 312, 672 individually, based on the target device type 708, and where the target device was physically located 704. In most storage systems containing multiple target devices 132, 644, separate bays, or slots, are used to store each target device 132, 644. Often, storage devices such as hard disk drives or solid state disks (SSDs) are individually mounted on hot-pluggable sleds that blind mate with a receptacle on a passive midplane 336 or backplane. Each slot 704 will likely have slightly different electrical performance due to different routing of cables, PCB traces, or connector locations. In addition, component variations including PCB manufacturing variances contribute to different electrical performance based on storage system slot 704.

One approach to optimizing electrical performance in a system having multiple target devices 132, 644 and multiple potential slots, or locations 704 for each target device 132, 644, without having to perform downshift/up shift evaluation (or in addition to performing downshift/up shift evaluation) is to initially configure PHY parameters 404 for each target device type 708 based on storage enclosure slot 704. This will likely produce much more reliable initial configuration, since the PHY parameters 404 will be pre-tested for optimal electrical performance and reliability. For example, target device 4 in storage enclosure slot 5 will cause the corresponding PHY parameters 404 to be programmed with PHY parameters 4,5.

At the initial system power-on, it is usually not known what target device type 708 is in a specific storage enclosure slot 704. The CPU 608 must query the target device 132, 644 in order to determine the target device type 708. A mitigating solution is to program each PHY 312, 672 with average PHY parameters 712 for the corresponding slot 704. Therefore, the PHY 312, 672 for storage enclosure slot 0 will be initially programmed with slot 0 average PHY parameters 712. After the CPU 608 later queries the target device 644 in slot 0 and determines the target device type 708, the CPU 608 can optionally program the specific PHY parameters 404 for slot 0 into the PHY 312, 672. The advantage of the programmable PHY parameters 404 of FIG. 7 is better likelihood of initial reliable data transmission on links 124, 236, 156, 652, 656, and 660.

Although FIG. 7 is described as containing average 712 and optimal PHY parameters for combinations of storage enclosure slots 704 and target 132, 644 device types 708, such a table 404 may also contain average 712 and optimal PHY parameters for receivers other than target devices 132, 644. For example, the table 404 may also contain average 712 and optimal PHY parameters for links where the receiver is a protocol controller 232, 664, or an expander 140, 640.

Referring now to FIG. 8, a flowchart illustrating steps of PHY 312, 672 initial configuration in accordance with embodiments of the present invention is shown. The steps illustrated in FIG. 8 occur prior to I/O request initiation between initiators 604 and target devices 132, 644. Although the steps of FIG. 8 are stated with respect to an expander 140, 640 and a target device 132, 644, it should be understood that the same steps apply to links between a protocol controller 664 and an expander 140, 640, a first expander 140, 640 and a second expander 140, 640, a protocol controller 664 and a target device 132, 644, or an expander 140, 640 and a target device 132, 644. Flow begins at block 804.

At block 804, the expander 140, 640 powers up or is manually reset. Manual reset may be performed by the CPU 608 or by user direction. Flow proceeds to block 808.

At block 808, the expander 140, 640 reads expander boot code 328 and customer-specific code 332 from external non-volatile memory 324 and configures itself and configures each PHY 312, 672 with average PHY parameters 712. PHYs 312, 672 in protocol controllers 664 and target devices 644 configure themselves in a similar fashion. Flow proceeds to block 812.

At block 812, the expander 140, 640 attempts to identify connected (or "normal") receiver 604, 140, 640, 132, 644. Identification may occur by any method available to the expander 140, 640 (or transmitter), such as SCSI inquiry commands or SAS address, or a user physically identifying the target device 132, 644 or receiver and entering an identifier into a table through an appropriate user interface. Flow proceeds to decision block 816.

At decision block 816, the expander 140, 640 determines if there is a receiver 604, 140, 640, 132, 644 identification failure, for each of the connected receivers 604, 140, 640, 132, 644. An identification failure is either a lack of response to the expander 140, 640 inquiry of block 812, or a response that prevents the expander 140, 640 from uniquely identifying the receiver 604, 140, 640, 132, 644. If there is an identification failure, then flow proceeds to decision block 820. If there is not an identification failure, then flow proceeds to block 832.

At decision block 820, the expander 140, 640 determines if there have been n identification failures to any connected receiver 604, 140, 640, 132, 644. In a preferred embodiment, n=3. Three identification failures are a useful number of failures that generally rule out command timeouts or normal response latency. However, in other embodiments block 820 may look for fewer than or more than three receiver 604, 140, 640, 132, 644 identification failures. If n identification failures have not occurred yet, then flow proceeds back to block 812 where receiver 604, 140, 640, 132, 644 identification is retried. If n receiver 604, 140, 640, 132, 644 identification failures have occurred, then flow proceeds to block 824.

At block 824, the expander 140, 640 notifies initiator 604 of receiver 604, 140, 640, 132, 644 identification failure. In one embodiment, the initiator 604 polls the expander 140, 640 for PHY 312, 672 status, and receives a receiver 604, 140, 640, 132, 644 identification failure message in return. In another embodiment, the expander proactively sends a receiver 604, 140, 640, 132, 644 identification failure message to the initiator 604. Flow proceeds to block 828.

At block 828, the initiator 604 notifies a user or system administrator of receiver 604, 140, 640, 132, 644 identification failure. In one embodiment, the user or system administrator polls the initiator 604 for PHY 312, 672 status, and receives a receiver 604, 140, 640, 132, 644 identification failure message in return. In another embodiment, the initiator 604 proactively sends a receiver 604, 140, 640, 132, 644 identification failure message to the user or system administrator. In either case, the user or system administrator is notified 616 by management controller 224, 668. Flow proceeds to block 904 of FIG. 9.

At block 832, the expander 140, 640 has received valid inquiry data from receiver 604, 140, 640, 132, 644, and receiver 604, 140, 640, 132, 644 has been identified. Flow proceeds to block 836.

At block 836, the expander 140, 640 stores an indication of target mode support in the connected ("normal") receiver. The indication of target mode support provides the transmitter with information about which error counters 636 to read, as described with reference to FIG. 6. Flow proceeds to block 840.

At block 840, the expander 140, 640 cross references inquiry data 708 and slot position 704 in a table stored in non-volatile memory 324, 612, or non-volatile memory within transmitter 604, 140, 640, 132, 644, to obtain specific PHY parameters. Flow proceeds to block 844.

At block 844, the expander 140, 640 writes specific PHY parameters to PHY 312, 672. At this point, PHYs 312, 672 configured by this process are considered to be optimally configured. Flow proceeds to block 848.

At block 848, the expander 140, 640 commands Decision Feedback Equalization (DFE) training for the PHY 312, 672 and link 652, 656, 660 to the receiver 604, 140, 640, 132, 644. At this point the links 652, 656, 660 are configured and initiator 604 is able to send data or commands to target devices 132, 644. Flow proceeds to block 904 of FIG. 9.

Referring now to FIG. 9, a flowchart illustrating steps of downshift evaluation in accordance with embodiments of the present invention is shown. The steps of FIG. 9 are executed by each transmitter in parallel and asynchronously with normal I/O request activity between host computers 116, 136, initiators 604, and target devices 132, 644. Transmitters are protocol controllers 664, expanders 140, 640, and target devices 132, 644 that execute the process of the present invention. The process of FIG. 9 is executed for each PHY 312, 672 in the transmitter. Flow begins at block 904.

At block 904, each protocol controller 664, expander 140, 640, or target device PHY 312, 672 transmitter polls receivers to read one or more receiver error counts. If the normal receiver does not support target mode, then the transmitter only reads error counts from the receiver in the same PHY 312, 672 as the transmitter. If the normal receiver does support target mode, then the transmitter reads error counts from the normal receiver as well as the receiver in the same PHY 312, 672 as the transmitter. Flow proceeds to block 908.

At block 908, each protocol controller 664, expander 140, 640, or target device PHY 312, 672 transmitter stores receiver error counts as stored error counts 620. If the normal receiver does not support target mode, then the receiver error count is the current count in the error counters 636 receiver in the same PHY 312, 672 as the transmitter. If the normal receiver does support target mode, then the transmitter reads error counts from the normal receiver as well as the receiver in the same PHY 312, 672 as the transmitter. In one embodiment, whichever of the two error counts is higher will be stored as the stored error count 620. In another embodiment, whichever of the two error counts is lower will be stored as the stored error count 620. Blocks 904 and 908 establish a count baseline for following time periods. Flow proceeds to block 912.

At block 912, a predetermined time period expires. In one embodiment, each transmitter (protocol controller 664, expanders 140, 640, and target devices 132, 644) has a separate timer. Although the timer period is the same for all PHYs 312, 672, it may either be coincident or staggered. Therefore, in one embodiment all timers begin counting at the same time. In a second embodiment, each timer begins counting at a different time. The second embodiment has the advantage of polling receivers at different times, spreading out I/O latencies to each receiver PHY 312, 672. In a third embodiment, the initiator 604 transmits a command at a regular time interval to all connected protocol controllers 664, expanders 140, 640, and target devices 132, 644. The command would direct the protocol controllers 664, expanders 140, 640, and target devices 132, 644 to perform the steps of blocks 908-940. Flow proceeds to block 916.

At block 916, the protocol controller 664, expander 140, 640, or target device PHY 312, 672 transmitter reads the stored indication of receiver target mode support. The indication was previously stored in block 836 of FIG. 8. Reading the stored indication determines whether the transmitter reads one or more of the normal receiver error counters (if target mode is supported) and the receive port error counters for the same PHY 312, 672 as the transmitter, or if the transmitter reads only receive port error counters for the same PHY 312, 672 as the transmitter (if target mode is not supported). Flow proceeds to block 920.

At block 920, the protocol controller 664, expander 140, 640, or target device PHY 312, 672 transmitter polls all attached receivers to read the receiver error count 636a, 636b, 636c, 636d, 636e, or 636f. All receivers have error counters 636a, 636b, 636c, 636d, 636e, or 636f, and the present invention is usable for all receivers, whether a protocol controller 664, expander 140, 640, or target device 132, 644. Flow proceeds to block 924.

At block 924, each protocol controller 664, expander 140, 640, or target device 132, 644 compares the receiver error count 636a, 636b, 636c, 636d, 636e, or 636f to a stored error count 620 for the previous time period. This step establishes the delta error count for the current sampling period. Note that each transmitter 664, 140, 640, 132, or 644 maintains a stored count 620 for each attached receiver 664, 140, 640, 132, or 644. Flow proceeds to decision block 928.

At decision block 928, the transmitter 664, 140, 640, 132, or 644 determines if the delta error count is less than a predetermined threshold. In a preferred embodiment, the predetermined threshold is ten errors in a one minute sampling (polling) period. In other embodiments, the predetermined threshold may be more or less than ten errors in a one minute sampling period. If the delta count is less than the predetermined threshold, then a transmission speed downshift does not occur and flow proceeds to block 912 to wait for the next sampling period. If the delta count is not less than the predetermined threshold, then flow proceeds to decision block 932 and there is a possibility of a link transmission speed downshift.

At decision block 932, the transmitter 664, 140, 640, 132, or 644 determines if a lower transmission speed is available. If the PHY 312, 672 is already operating at the lowest available transmission speed, then no additional lower transmission speeds are available. For example, a PHY 312, 672 supports 3 Gb/s and 6 Gb/s transmission speeds. If the PHY 312, 672 was operating at 6 Gb/s, then a lower transmission speed of 3 Gb/s is available. If the PHY 312, 672 was operating at 3 Gb/s, then no lower transmission speeds are available. If no lower transmission speeds are available then flow normally proceeds to block 944. If no lower transmission speeds are available then flow optionally proceeds to block 948. If lower transmission speeds are available then flow proceeds to block 936.

At block 936, the transmitter 664, 140, 640, 132, or 644 downshifts the transmission speed for the link 652, 656, 660 to the next lower transmission speed. Flow proceeds to block 940.

At block 940, the transmitter 664, 140, 640, 132, or 644 initiates link renegotiation for the downshifted link 652, 656, 660. As described previously with respect to FIG. 6. Link renegotiation results in both paths of link 652, 656, 660 operating at the same transmission speed. Link renegotiation is part of the SAS protocol, and is described in the referenced documents. Flow proceeds to block 944.

At block 944, the transmitter 664, 140, 640, 132, or 644 saves the most recent receiver error count to transmitter 664, 140, 640, 132, or 644 memory as stored count 620. This establishes the error baseline for the next sampling period in step 912-924. Flow proceeds to block 912.

At optional block 948, the transmitter 664, 140, 640, 132, or 644 initiates a standard retraining process for the link 652, 656, or 660 corresponding to the high error count determined in block 916. Retraining consists of a small number of transfers between the transmitter 664, 140, 640, 132, or 644 and receiver to determine at a basic level if data can be transferred. Retraining is described in the referenced SAS documents. Flow proceeds to block 944.

Referring now to FIG. 10, a flowchart illustrating steps of up shift evaluation in accordance with embodiments of the present invention is shown. Flow begins at blocks 1004, 1008, and 1012.

At block 1004, the transmitter 664, 140, 640, 132, or 644 experiences a power-up. A power-up could an initial power-up, or a power-up following a voluntary or involuntary power-down. Flow proceeds to block 1016.

At block 1008, a user or system administrator selects a manual rescan of the initiator 604 and all receivers behind the initiator 604, including protocol controller 664, expanders 140, 640, and target devices 132, 644. Flow proceeds to block 1016.

At block 1012, the transmitter 664, 140, 640, 132, or 644 detects a link up transition. A link up transition occurs whenever a cable or receiver is replaced. In a preferred embodiment, only the link corresponding to a link up transition is evaluated for up shift when a link up transition occurs. In another embodiment, all links are evaluated for up shift when a link up transition occurs. Flow proceeds to block 1016.

At block 1016, the transmitter 664, 140, 640, 132, or 644 selects an initial PHY 312, 672 for up shift evaluation. Flow proceeds to decision block 1020.

At decision block 1020, the transmitter 664, 140, 640, 132, or 644 determines if a higher transmission speed 408 is available, for the selected PHY 312, 672. If a higher transmission speed 408 for the selected PHY 312, 672 is not available, then flow proceeds to decision block 1032. If a higher transmission speed for the selected PHY 312, 672 is available, then flow proceeds to block 1024.

At block 1024, the transmitter 664, 140, 640, 132, or 644 up shifts the transmission speed for the selected PHY 312, 672 to the next higher transmission speed. Flow proceeds to block 1028.

At block 1028, the transmitter 664, 140, 640, 132, or 644 initiates link retraining for the up shifted link. As described previously with respect to FIG. 6, link renegotiation results in both paths of link 652, 656, 660 operating at the same transmission speed. Link renegotiation is part of the SAS protocol, and is described in the references documents. Flow proceeds to block 1036.

At decision block 1032, the transmitter 664, 140, 640, 132, or 644 determines if more PHYs 140, 640 remain to attempt up shift of transmission speed. If the transmitter 664, 140, 640, 132, or 644 determines that there are not more PHYs 140, 640 to attempt up shift of transmission speed, then up shift evaluation is completed and the process ends. If the transmitter 664, 140, 640, 132, or 644 determines that there are more PHYs 140, 640 to attempt up shift of transmission speed, then flow proceeds to block 1036.

At block 1036, the transmitter 664, 140, 640, 132, or 644 selects a next PHY 140, 640 for up shift evaluation. For example, if the transmitter is an expander 140 and only a first PHY 312a has been up shifted, the transmitter selects a second PHY 312b. Flow proceeds to decision block 1020.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A method for maintaining reliable communication on a bidirectional communication link, comprising:
   detecting, by a receiver on the bidirectional communication link, an error;
   maintaining, by the receiver, a count of detected errors;
   polling the receiver, by a transmitter on the bidirectional communication link, in order to determine the count of detected errors;
   performing, by the transmitter, a downshift evaluation for the bidirectional communication link, wherein the downshift evaluation comprises:
      requiring transmission speed downshift if the difference between the count of detected errors and a stored count is greater than a predetermined value; and
      forgoing transmission speed downshift if the difference between the count of detected errors and the stored count is less than the predetermined value;
   in response to performing the downshift evaluation for the path,
      maintaining a transmission speed of the path if the downshift evaluation determines that forgoing transmission speed downshift is required for the bidirectional communication link; and
      reducing the transmission speed of the path if the downshift evaluation determines that transmission speed downshift is required for the bidirectional communication link.

2. The method of claim 1, further comprising:
   determining, by the transmitter, if a receiver on the opposite end of the bidirectional communication link from the transmitter supports target mode;
      if the receiver on the opposite end of the bidirectional communication link from the transmitter does not support target mode, then polling a receiver on the same end of the bidirectional communication link as the transmitter to determine the count of detected errors; and
      if the receiver on the opposite end of the bidirectional communication link from the transmitter supports target mode, then polling at least one of the receiver on the same end of the bidirectional communication link and the receiver on the opposite end of the bidirectional communication link to determine the count of detected errors.

3. The method of claim 1, wherein requiring transmission speed downshift comprises reducing the transmission speed of the bidirectional communication link to a next lower transmission speed, if a lower transmission speed is available.

4. The method of claim 3, wherein the transmitter initiates link retraining if a lower transmission speed is not available.

5. The method of claim 1, wherein forgoing transmission speed downshift comprises maintaining a current transmission speed for the bidirectional communication link.

6. The method of claim 1, wherein the bidirectional communication link is one of a plurality of bidirectional communication links sequentially serially arranged between an initiator and a target device, wherein the receiver is associated with another link of the plurality of bidirectional communication links, wherein the transmitter performs the downshift evaluation for the other link of the plurality of bidirectional communication links, wherein the transmitter performs the maintaining and reducing steps for the transmission speed of the other link of the plurality of bidirectional communication links based on the downshift evaluation for the other link of the plurality of bidirectional communication links.

7. The method of claim 6, further comprising:
   determining, by the transmitter, if the receiver associated with the other link of the plurality of bidirectional communication links supports target mode;
      if the receiver associated with the other link of the plurality of bidirectional communication links does not support target mode, then polling a receiver on the same end of the bidirectional communication link as the transmitter to determine the count of detected errors; and
      if the receiver associated with the other link of the plurality of bidirectional communication links supports target mode, then polling at least one of the receiver on the same end of the other link of the plurality of bidirectional communication links and the receiver on the opposite end of the other link of the plurality of bidirectional communication links to determine the count of detected errors.

8. A system for maintaining reliable communication on a bidirectional communication link, comprising:
   a transmitter;
   a receiver; and
   the bidirectional communication link, wherein the bidirectional communication link is coupled to the transmitter and the receiver,
   wherein the receiver detects an error and maintains a count of detected errors, wherein the transmitter polls the receiver in order to determine the count of detected errors, wherein the transmitter performs a downshift evaluation for the bidirectional communication link, and in response to performing the downshift evaluation, the transmitter maintains the transmission speed of the bidirectional communication link if the downshift evaluation determines that forgoing a transmission speed downshift is required for the bidirectional communication link and the transmitter reduces the transmission speed of the bidirectional communication link if the downshift evaluation determines that a transmission speed downshift is required for the bidirectional communication link,
   wherein the downshift evaluation comprises wherein the transmitter requires transmission speed downshift if the difference between the count of detected errors and a stored count is greater than a predetermined value and the transmitter forgoes transmission speed downshift if the difference between the count of detected errors and the stored count is less than the predetermined value.

9. The system of claim 8, wherein the transmitter determines if a receiver on the opposite end of the bidirectional communication link from the transmitter supports target mode;
   if the receiver on the opposite end of the bidirectional communication link from the transmitter does not support target mode, then the transmitter polls a receiver on the same end of the bidirectional communication link as the transmitter to determine the count of detected errors; and
   if the receiver on the opposite end of the bidirectional communication link from the transmitter supports target mode, then the transmitter polls at least one of the receiver on the same end and the receiver on the opposite end of the bidirectional communication link to determine the count of detected errors.

10. The system of claim 8, wherein transmission speed downshift comprises wherein the transmitter reduces the transmission speed of the bidirectional communication link to a next lower transmission speed, if a lower transmission speed is available.

11. The system of claim 10, wherein the transmitter initiates link retraining if a lower transmission speed is not available.

12. The system of claim 8, wherein the transmitter forgoes transmission speed downshift comprises maintaining a current transmission speed for the bidirectional communication link.

13. The system of claim 8, wherein the bidirectional communication link is one of a plurality of bidirectional communication links sequentially serially arranged between an initiator and a target device, wherein the receiver is associated with another link of the plurality of bidirectional communication links, wherein the transmitter performs the downshift evaluation for the other link of the plurality of bidirectional communication links, wherein the transmitter maintains and reduces the transmission speed of the other link of the plurality of bidirectional communication links based on the downshift evaluation for the other link of the plurality of bidirectional communication links.

14. The system of claim 13, wherein the transmitter determines if the receiver associated with the other link of the plurality of bidirectional communication links supports target mode;
   if the receiver associated with the other link of the plurality of bidirectional communication links does not support target mode, then the transmitter polls a receiver on the same end of the bidirectional communication link as the transmitter to determine the count of detected errors; and
   if the receiver associated with the other link of the plurality of bidirectional communication links supports target mode, then the transmitter polls at least one of the receiver on the same end of the other link of the plurality of bidirectional communication links and the receiver on the opposite end of the other link of the plurality of bidirectional communication links to determine the count of detected errors.

15. The system of claim 14, wherein multiple receivers associated with the plurality of bidirectional communication links independently detect errors and maintain a count of detected errors, wherein multiple transmitters in the plurality of bidirectional communication links poll the multiple receivers, determine if transmission speed downshift is required for any links in the plurality of bidirectional communication links, and downshift transmission speed for any required links in the plurality of bidirectional communication links if a lower transmission speed is available.

16. A method for providing reliable point-to-point communications for a bidirectional communication link, comprising:
   determining if a first receiver supports target mode;
      if the first receiver does not support target mode, then polling a second receiver, by a transmitter, to determine the count of detected errors, wherein the transmitter, the first receiver, and the second receiver are directly coupled to the bidirectional communication link; and
      if the first receiver supports target mode, then polling at least one of the first receiver and the second receiver, by the transmitter, to determine the count of detected errors;
   in response to the transmitter polling the count of detected errors in at least one of the first and second receivers, performing, by the transmitter, a downshift evaluation;
   determining if the downshift evaluation requires a downshift of a transmission speed for the bidirectional communication link, and in response:
      maintaining the bidirectional communication link transmission speed if the downshift evaluation does not require a reduction in transmission speed; and
      reducing the bidirectional communication link transmission speed to a next lower path transmission speed if the downshift evaluation requires a reduction in transmission speed, if a lower bidirectional communication link transmission speed is available; and
   performing, by the transmitter, an up shift evaluation after one of a transmitter power up, a user selection of manual rescan, and the transmitter detects a link-up transition.

17. The method of claim 16, wherein the downshift evaluation comprises:
   requiring transmission speed downshift if the difference between the count of detected errors and a stored count is greater than a predetermined value; and forgoing transmission speed downshift if the difference between the count of detected errors and the stored count is less than the predetermined value.

18. The method of claim 16, wherein up shift evaluation comprises:
  for each of a plurality of PHYs in a system comprising the bidirectional communication link:
    determining if a higher transmission speed is available;
    if a higher transmission speed is not available, proceeding to the next PHY in the system;
    if a higher transmission speed is available, up shifting the PHY to the next higher transmission speed;
  wherein up shift evaluation is only performed for the bidirectional communication link corresponding to the link-up transition when the link-up transition occurs.

* * * * *